US012761949B2

(12) United States Patent
Subramanian et al.

(10) Patent No.: US 12,761,949 B2
(45) Date of Patent: Oct. 13, 2026

(54) WORKFLOW MANAGEMENT METHOD, SYSTEM AND COMPUTER PROGRAM PRODUCT WITH DYNAMIC WORKFLOW CREATION FOR MODIFYING A WORKFLOW BASED ON AN ELEMENT CONFIGURATION OF AN ELEMENT AT WHICH THE MODIFIED WORKFLOW IS TO BE EXECUTED

(71) Applicant: Rakuten Mobile, Inc., Tokyo (JP)

(72) Inventors: Amutha Subramanian, Singapore (SG); Mohit Luthra, Singapore (SG); Jiayi Qian, Tokyo (JP); Ishika Godage, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 722 days.

(21) Appl. No.: 18/041,994

(22) PCT Filed: Sep. 23, 2022

(86) PCT No.: PCT/US2022/044489
§ 371 (c)(1),
(2) Date: Feb. 16, 2023

(87) PCT Pub. No.: WO2024/063781
PCT Pub. Date: Mar. 28, 2024

(65) Prior Publication Data

US 2024/0272935 A1 Aug. 15, 2024

(51) Int. Cl.
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 7,565,640 | B2 | 7/2009 | Shukla et al. | |
| 8,261,233 | B2 * | 9/2012 | Szpak | G06Q 10/10 717/109 |
| 8,812,660 | B2 * | 8/2014 | Rowlands | G06Q 10/00 717/109 |
| 9,563,478 | B1 * | 2/2017 | Miller | G06F 9/5038 |
| 10,467,050 | B1 * | 11/2019 | Schmidgall | G06F 9/4881 |
| 10,956,213 | B1 * | 3/2021 | Chambers | G06F 9/4881 |
| 11,106,331 | B1 * | 8/2021 | Porter | G06Q 10/06 |
| 11,233,738 | B1 * | 1/2022 | Wires | H04L 41/0816 |

(Continued)

OTHER PUBLICATIONS

Calheiros et al. "Meeting Deadlines of Scientific Workflows in Public Clouds with Tasks Replication", 2014 IEEE, pp. 1787-1796.*

(Continued)

*Primary Examiner* — Van H Nguyen
(74) *Attorney, Agent, or Firm* — HAUPTMAN HAM, LLP

(57) ABSTRACT

A workflow management system includes a processor, and a storage medium storing executable instructions. The executable instructions, when executed, instruct the processor to load a workflow including a plurality of tasks arranged in a sequence, automatically modify the workflow to obtain a modified workflow based on an element configuration of an element for workflow execution, and cause execution of the modified workflow at the element.

15 Claims, 15 Drawing Sheets

(56) References Cited

U.S. PATENT DOCUMENTS

| | | | | |
|---|---|---|---|---|
| 2001/0044738 | A1* | 11/2001 | Elkin | G06Q 10/0631 705/7.26 |
| 2006/0136490 | A1* | 6/2006 | Aggarwal | G06Q 10/06 |
| 2012/0324074 | A1* | 12/2012 | Rowlands | G06Q 50/06 709/223 |
| 2014/0075413 | A1 | 3/2014 | Binjrajka | |
| 2015/0178062 | A1 | 6/2015 | Adderly et al. | |
| 2017/0364843 | A1 | 12/2017 | Haligowski et al. | |
| 2022/0308911 | A1* | 9/2022 | Barkett | G06F 9/546 |

OTHER PUBLICATIONS

Sirvent et al. "Graph-based task replication for workflow applications", 2009 IEEE, pp. 20-28.*

* cited by examiner

WORKFLOW MANAGEMENT METHOD, SYSTEM AND COMPUTER PROGRAM PRODUCT WITH DYNAMIC WORKFLOW CREATION FOR MODIFYING A WORKFLOW BASED ON AN ELEMENT CONFIGURATION OF AN ELEMENT AT WHICH THE MODIFIED WORKFLOW IS TO BE EXECUTED

RELATED APPLICATIONS

The present application is a National Phase of International Application No. PCT/US2022/044489, filed Sep. 23, 2022.

TECHNICAL FIELD

The present disclosure is related to workflows and workflow management.

BACKGROUND

Many industries, services, applications, businesses, etc. have procedures that are complex and prone to error due to various internal guidelines and/or external mandates. Workflows are developed to present such complex procedures in a manner that is easier for humans to follow the procedures, while reducing potential errors such as steps being omitted, or performed incorrectly or out of order, etc.

SUMMARY

In some embodiments, a workflow management system comprises at least one processor, and at least one computer readable storage medium coupled to the at least one processor and configured to store executable instructions. The executable instructions, when executed by the at least one processor, instruct the at least one processor to load a workflow comprising a plurality of tasks arranged in a sequence, automatically modify the workflow to obtain a modified workflow based on an element configuration of an element for workflow execution, and cause execution of the modified workflow at the element.

In some embodiments, a workflow management method is performed at least in part by at least one processor. The method comprises loading a workflow comprising a plurality of tasks arranged in a sequence. The plurality of tasks comprises at least one first task and at least one second task connected to the at least one first task. For a group of nodes, the method further comprises generating at least one replica of the at least one first task, and connecting the at least one replica of the at least one first task to the at least one second task to obtain a modified workflow. The method further comprises causing execution of the modified workflow, wherein the at least one first task is executed at each node in the group of nodes, and the at least one second task is executed at one or more nodes in the group of nodes.

In some embodiments, a computer program product comprises a non-transitory, tangible computer readable storage medium storing a computer program that, when executed by at least one processor, instructs the at least one processor to, in response to user selection of a workflow, visually present at least one input area for receiving user input of an element for workflow execution. The workflow comprises a first set of tasks followed by a second set of tasks. The at least one processor is further instructed to, in response to the user input of the element, modify the workflow to obtain a modified workflow to be executed at the element, wherein a number of the first set of tasks in the modified workflow is equal to a number of nodes in the element. The at least one processor is further instructed to visually present the modified workflow and, in response to user instruction to execute the visually presented modified workflow, cause execution of the first set of tasks at each of the nodes of the element and then cause execution of the second set of tasks at one or more nodes of the element.

BRIEF DESCRIPTION OF THE DRAWINGS

Aspects of the present disclosure are best understood from the following detailed description when read with the accompanying figure. In accordance with the standard practice in the industry, various features are not drawn to scale. In fact, the dimensions of the various features be arbitrarily increased or reduced for clarity of discussion.

DETAILED DESCRIPTION

Figure 1:
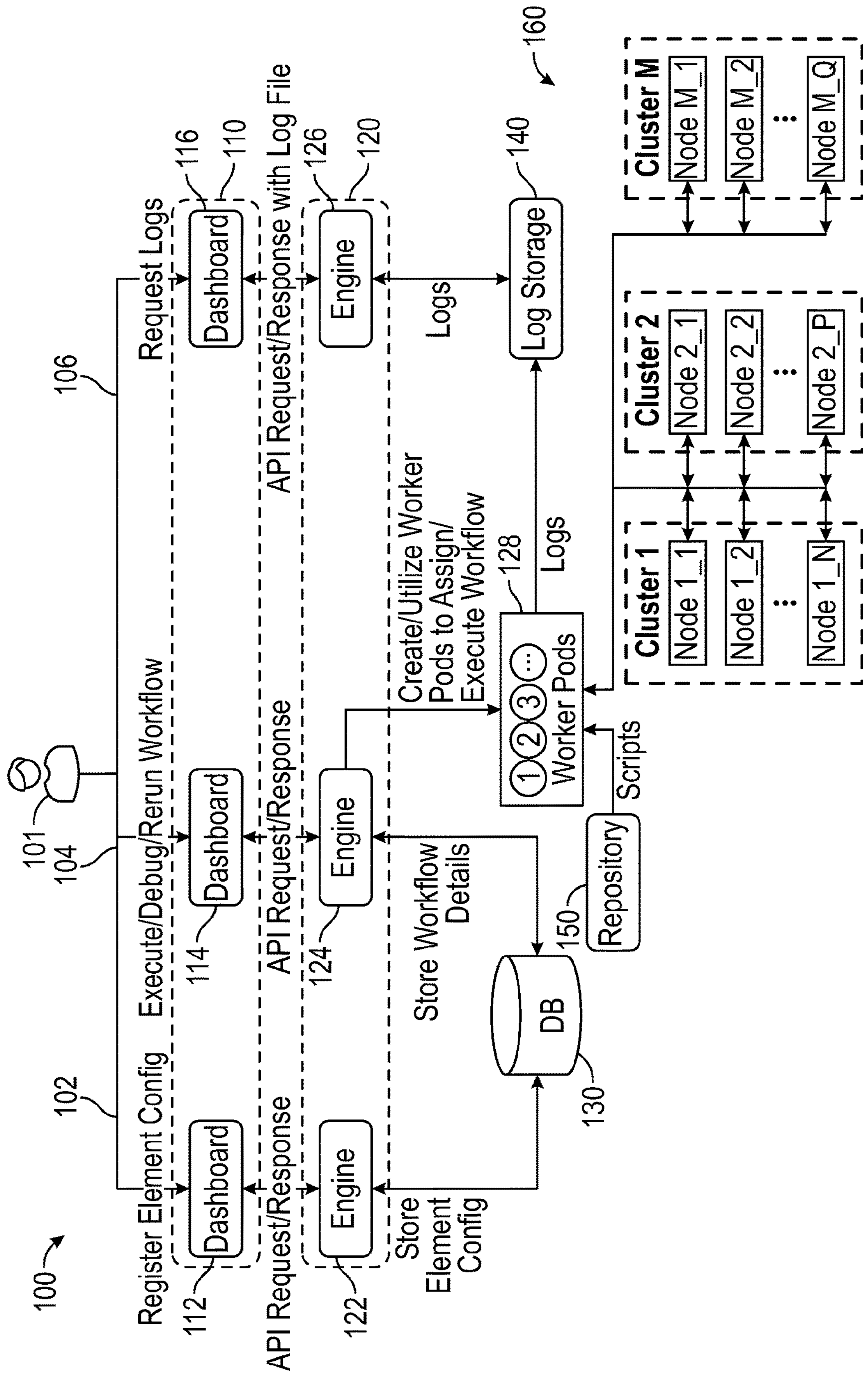
FIG. 1 is a schematic diagram of a workflow management system, in accordance with some embodiments.

The following disclosure includes many different embodiments, or examples, for implementing different features of the subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed. Further, spatially relative terms, such as “beneath,” “below,” “lower,” “above,” “upper” and the like, be usable herein for ease of description to describe one element or feature’s relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors usable herein likewise be interpreted accordingly.

A workflow presents, in a step-by-step manner, of a process for how work is to be done. Examples of processes include, but are not limited to, business and/or technical plans, procedures, customer support/service, or the like. In complex technical situations, or where the number of workflows and/or the number of tasks in a workflow is/are high, or where the tasks of one or more workflows are to be executed at one or more locations physically remote from a manager or supervisor, the ability to remotely monitor and/or control workflow execution is a consideration.

In some embodiments, a workflow management system is configured to create modified workflows from a workflow reusable as a workflow template. In one or more embodiments, the workflow management system is configured to generate different modified workflows from a same workflow, depending on different element configurations of various elements at which the generated workflows are to be executed. For example, the workflow management system is configured to replicate at least a portion of the workflow based on a number of nodes in an element selected for workflow execution. As a result, in at least one embodiment, it is possible to quickly scale the same workflow to obtain modified workflows corresponding to various elements with different sizes (e.g., different numbers of nodes). In some embodiments, a user of the workflow management system is provided with a user interface (UI) for creating his/her own workflows, and/or for managing workflows, elements and/or functions in the workflow management system. The UI is further configured to permit a user to cause automatic generation of dynamic workflows from existing workflows as described herein, execute workflows, and/or monitor statuses of the executed workflows. In at least one embodiment, such automatic generation of dynamic workflows from workflows usable as templates reduces the amount of time and/or efforts that would be otherwise spent on manual work and/or travel for preparation and/or execution of scripts to perform similar tasks. A potentially high number of human errors associated with manual work is avoidable as well in one or more embodiments. Further features and/or advantages are within the scopes of various embodiments.

FIG. 1 is a schematic diagram of a workflow management system 100, in accordance with some embodiments.

The workflow management system 100 comprises a dashboard microservice 110, engines 120, a database 130, and a log storage 140. A repository 150 and one or more elements 160 are also illustrated in FIG. 1. In at least one embodiment, the repository 150 is a part of the workflow management system 100. In some embodiments, the repository 150 is at least partially external to the workflow management system 100. The elements 160 are example of locations, sites or equipment where one or more workflows managed by the workflow management system 100 are executed.

In some embodiments, at least one, or some, or all of the components illustrated in FIG. 1, e.g., the dashboard microservice 110, engines 120, database 130, log storage 140, repository 150, elements 160, and/or their sub-components (e.g., modules 112, 114, 116 and/or engines 122, 124, 126) comprise(s) hardware on/by which software corresponding to various algorithms and/or operations described here is executed. An example hardware configuration for any one or more of the components illustrated in FIG. 1 includes a computer system described with respect to FIG. 7. For example, at least one, or some, or all of the components of the workflow management system 100, repository 150, elements 160, and/or their sub-components include(s) executable instructions stored in at least one computer-readable medium and executed by at least one hardware processor. In some embodiments, one or more of the components in the workflow management system 100 and/or their sub-components are implemented on/by a cloud platform. Other configurations are within the scopes of various embodiments.

The dashboard microservice 110 includes a plurality of modules configured to provide one or more functions and/or operations described herein. For illustration purposes, the dashboard microservice 110 in FIG. 1 includes modules 112, 114, 116. However, other numbers and/or types of modules are within the scopes of various embodiments. In at least one embodiment, at least one of the modules 112, 114, 116 includes a set of modules. In at least one embodiment, the example modules 112, 114, 116 are different from each other, or share at least one common module.

The dashboard microservice 110 comprises one or more modules configured to generate a graphic user interface (hereinafter "UI") for a user 101. The UI generated by the dashboard microservice 110 is visually presented to the user to help the user to create and/or manage various workflows and workflow executions as described herein. In some embodiments, an example of visual presentation of a workflow and/or screens of a UI includes displaying the workflow and/or UI screens on a display, such as a monitor or a touch screen. The display may be a display of a computer system implementing one or more components of the workflow management system 100, or a remote display coupled to one or more components of the workflow management system 100 through a network or communication link. Other ways for visually presenting information, such as projection on a screen, three-dimensional (3D) projection, using glasses and/or other head-mounted devices, or any other manners for presenting information to be visually perceptible by a user, are within the scopes of various embodiments. For simplicity, "displaying," "displayed," "displays," "showing," "shown," "shows," or similar wordings, may be used in the following description as example manners for visual presentation of information. Other manners for visual presentation, as discussed herein, are not excluded. A user may interact with displayed, or otherwise visually presented, information by a pointing device (e.g., a mouse), a touch screen, contact-less gestures, voice commands, or the like.

The dashboard microservice 110 further comprises one or more modules configured to, by themselves and/or in cooperation with one or more corresponding engines in the engines 120, create, manage, execute and/or monitor various workflows as described herein. In some embodiments, the dashboard microservice 110 is configured to provide functionalities to perform create, read, update and delete (CRUD) operations on various objects including, but not limited to, workflows, tasks, elements, functions, or the like. In some embodiments, the dashboard microservice 110 is configured to perform one or more of workflow and/or task execution, monitoring, debugging, resuming, and reporting through role-based access control (RBAC). In some embodiments, the dashboard microservice 110 comprises at least one node application. In some embodiments, the dashboard microservice 110 comprises at least one web-based application.

The engines 120 are configured to perform, together with or under control of the dashboard microservice 110, various operations and/or functions as described herein. For illustration purposes, the engines 120 in FIG. 1 include engines 122, 124, 126. However, other numbers and/or types of engines are within the scopes of various embodiments. In at least one embodiment, at least one of the engines 122, 124, 126 includes a set of engines. In at least one embodiment, the engines 122, 124, 126 are different from each other, or share at least one common engine. Examples of the engines 120 include, but are not limited to, Operating System (OS) install, OS upgrade, cluster install, cluster uninstall, cluster upgrade, scall in/out, hardware (HW) heath check, firmware upgrade, Field Programmable Gate Array (FPGA) upgrade, OS/FPGA reports, authentication, or the like. The engines 120 are configured to interact with the dashboard microservice 110 by application programming interface (API) requests/responses. For simplicity, in the description herein, operations and/or functions and/or controls performed by the dashboard microservice 110 and/or engines 120 are sometimes referred to as being performed by the system, or by the/a/at least one processor.

In an example operation 102, the UI of the dashboard microservice 110 provides the user 101 with at least one option to register an element configuration. For example, the user 101 interacts with the UI to provide user input for an element configuration to the module 112 of the dashboard microservice 110. The module 112 instructs the engine 122 to store the element configuration in the database 130.

An element configuration is a configuration or description of an element. In some embodiments, an element comprises one or more sites or equipment (e.g., a computer system) where one or more tasks of a workflow is/are executed. Examples of elements, as described herein, include, but are not limited to, bare metals, clusters, or the like. In some embodiments, a bare metal (BM) is a computer system without an OS and installed applications. In at least one embodiment, a BM comprises computer hardware that is installed with firmware, or basic input/output system (BIOS) software utility, or no software at all. In some embodiments, a BM after installation of an OS and one or more required applications becomes a server. In some embodiments, a node refers to a BM before or after OS installation. A cluster comprises a group of nodes interconnected and configured to work in cooperation. Example clusters are designated as "RC" in the drawings. Various cluster configurations are within the scopes of various embodiments. In some embodiments, to configure a group of nodes as a cluster, a first node in the group is installed or configured as a Primary Master (PM), at least one second node in the group is installed or configured as at least one Secondary Master (SM), and one or more further nodes in the group is/are installed or configured as one or more Agents. Other examples and/or configurations of nodes and/or clusters are within the scopes of various embodiments.

The elements 160 in FIG. 1 include examples of nodes and clusters. The elements 160 comprises M clusters, i.e., Cluster 1, Cluster 2, . . . Cluster M. Each cluster comprises a number of nodes. For example, Cluster 1 comprises N nodes, i.e., Node 1_1, Node 1_2, . . . Node 1_N, Cluster 2 comprises P nodes, i.e., Node 2_1, Node 2_2, . . . Node 2_P, . . . Cluster M comprises Q nodes, i.e., Node M_1, Node M_2, . . . Node M_Q, where, M, N, P, Q are natural numbers. In some embodiments, an element comprises a cluster, or a group of nodes to be installed as a cluster. In at least one embodiment, an element comprises at least one node in a cluster, or at least one independent node not included in a cluster. A specific example described herein involves execution of a workflow to configure a group of BMs as a cluster. This specific example is not-limiting. Other use cases and/or scenarios and/or applications of the workflow management system 100 are within the scopes of various embodiments. In a specific example, each cluster is, or constitutes a part of, a data center.

In a further example operation 104, the UI of the dashboard microservice 110 provides the user 101 with various options to build, execute, debug and/or resume a workflow. For example, the user 101 interacts with the UI to build a workflow comprising a plurality of tasks arranged or connected in a sequence. In some embodiments, the system, or another component outside the workflow management system 100, is configured to provide an environment, e.g., a graphing environment, for users to build workflows, and to save workflow configurations of the built workflows as Extensible Markup Language (XML) documents to be executed by a workflow engine among the engines 120 at runtime. In some embodiments, workflows are compliant with the Business Project Management Notation (BPMN) specification. Other workflow configurations and/or specifications and/or programing language or codes are within the scopes of various embodiments. In some embodiments, the system, or another component outside the workflow management system 100, comprises a template repository (or template manager) that contains prestored and/or predesigned workflow configurations which can be used as templates based on which new workflows may be quickly built. Workflow configurations and/or workflows created by or loaded into the workflow management system 100 are stored, e.g., by the engine 124 into the database 130. The database 130 comprises a single database or a set of database that stores templates, workflow configurations and element configurations. In some embodiments, the database 130 further stores workflow data generated during, and/or as a result of, execution of one or more workflows by the workflow engine.

The UI of the dashboard microservice 110 further provides the user 101 with various options to execute the built workflow, or execute a preexisting workflow. In an example, the engine 124 receives, through the module 114, user input or user selection of a workflow (to be used as a template) and an element where the workflow (or a modified workflow automatically generated from the workflow) is to be executed. For example, the engine 124 loads the corresponding element configuration and workflow configuration of the workflow from the database 130, and automatically modifies the workflow as necessary based on the element configuration to generate a modified workflow to be executed at the element. The engine 124 creates one or more worker pods 128, or utilizes one or more existing worker pods 128, and then assigns the one or more worker pods 128 to execute the modified workflow.

In at least one embodiment, the one or more worker pods 128 are created to execute functions associated with one or more tasks of the modified workflow to be executed. For example, each task runs in its own worker pod, so to execute a function associated with a task a worker pod is required, which is the actual instance that executes the task. In some situations, a task to be executed is not associated with a function in the workflow management system 100, but with one or more external scripts. In such situations, the one or more worker pods 128 load the one or more scripts from the repository 150, and cause the functions and/or scripts associated with the tasks in the modified workflow to be executed at the designated element (e.g., at a cluster or one or more nodes among the elements 160) in accordance with the sequence of the tasks in the workflow.

As the tasks (e.g., functions and/or scripts) are executed, log information related to the tasks and/or the nodes where the tasks are executed is generated and sent from the nodes to the one or more worker pods 128. Examples of log information include, but are not limited to, statuses, parameters, variables, conditions or the like. The one or more worker pods 128 redirect the log information to the log storage 140 to be stored therein.

Various options for debugging and/or resuming a workflow are also provided by the UI to the user 101. Based on user input or user selection of an option for debugging or resuming a workflow received through the module 114, the engine 124 makes appropriate correction in its instructions to the one or more worker pods 128 which cause the modified workflow to be executed, fully or partly, in accordance with the selected debugging or resuming option.

In some embodiments, at least one of the log storage 140 or repository 150 comprises a database implemented by one or more computer systems. In at least one embodiment, the one or more worker pods 128 include deployable units of computing that are created and managed in Kubernetes. Other worker pod configurations are within the scopes of various embodiments. In some embodiments, the worker pods are omitted or replaced with other virtual machines.

In another example operation 106, the UI of the dashboard microservice 110 provides the user 101 with at least one option to request real time log information related to a selected task of a selected workflow. For example, in response to the user's request for log information received through the UI, the module 116 sends the user's request to the engine 126. The engine 126 accesses the log storage 140 to retrieve the log information corresponding to the selected task of the selected workflow identified in the user's request, and sends the retrieved log information through the module 116 back to the UI where the log information is displayed to the user. In some embodiments, while the user is reviewing the log information (e.g., while the log information is still displayed), updated or new log information related to the selected task/workflow is updated in real time on the UI. In some embodiments, a potential error reflected in the displayed log information is fixed, located, or bypassed by using a debugging option and/or a resuming option.

FIGS. 2A-2B, 3A-3D, 4 and 5A-5I are schematic diagrams showing various screens or panels of a UI in a workflow management system, in accordance with some embodiments. In some embodiments, the UI is provided in the workflow management system 100 and generated by the dashboard microservice 110.

Figure 2A:
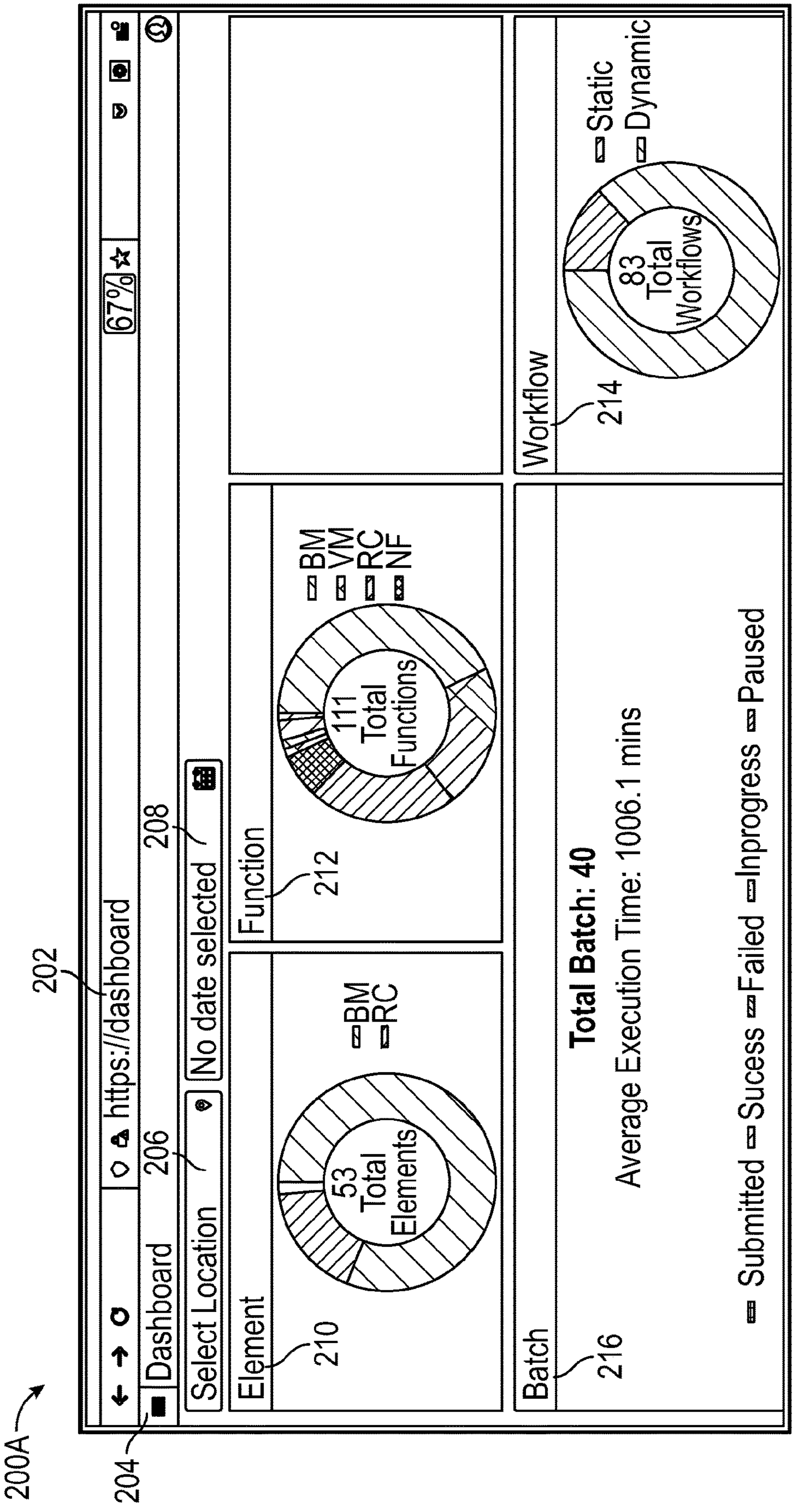
FIGS. 2A-2B, 3A-3D, 4 and 5A-5I are schematic diagrams showing various screens or panels of a user interface in a workflow management system, in accordance with some embodiments.

FIG. 2A is a schematic diagram of a dashboard screen 200A of the UI, in accordance with some embodiments. In some embodiments, the dashboard screen 200A is displayed upon successful authentication of a user who logs in the workflow management system 100. The dashboard screen 200A comprises an address bar 202, a setting button 204, a location selection menu 206, a date selection menu 208, and a plurality of visualization areas 210, 212, 214, 216.

The address bar 202 includes an address for accessing the dashboard screen 200A using a web browser. For simplicity, details of the address are omitted. One or more other screens of the UI as described herein also include a similar address bar. The address bar in one or more other screens is omitted for simplicity. In at least one embodiment, the web-based UI provides a flexibility in that a user may remotely log in and manage workflows using the workflow management system 100. In at least one embodiment, the UI is not web-based and the address bar is omitted.

Figure 2B:
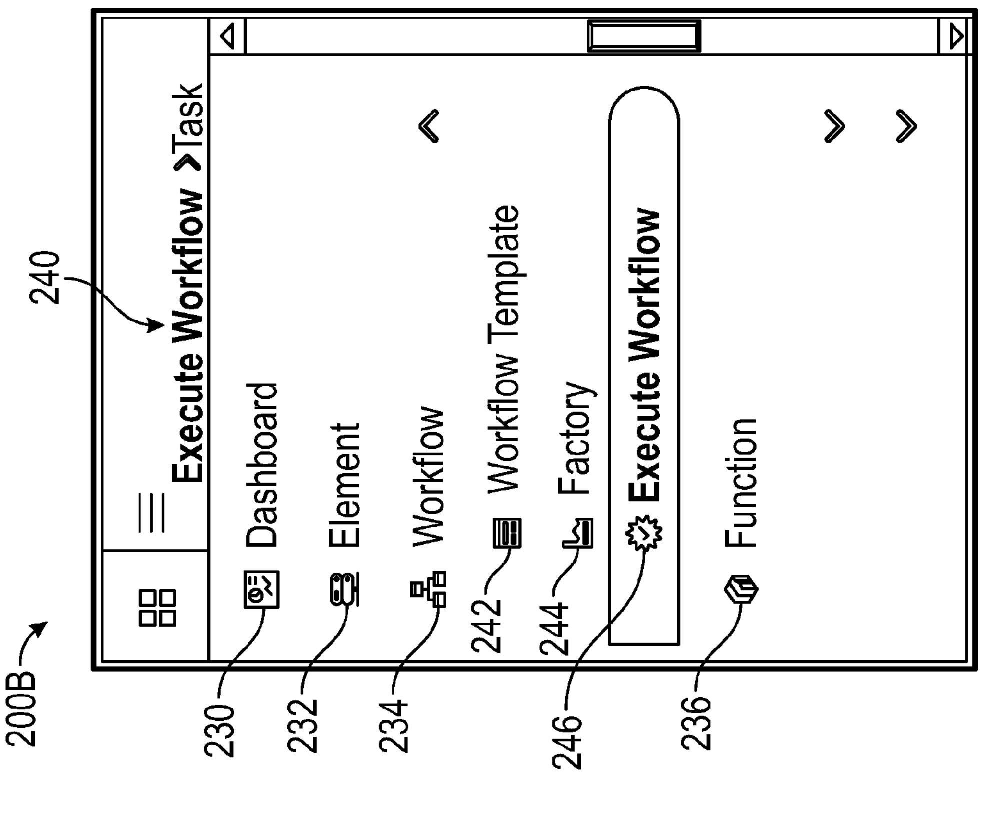

The setting button 204 is configured to permit access to other screens of the UI. For example, upon user operation of the setting button 204, a screen 200B in FIG. 2B is displayed, either in addition to or in place of a current screen. Details of the screen 200B are provided herein with respect to FIG. 2B.

The visualization areas 210, 212, 214, 216 provide overview information about various items in the workflow management system 100. For example, the visualization area 210 provides a count of elements registered under respective element types in the workflow management system 100. In the example configuration in FIG. 2A, the visualization area 210 shows that there are 53 elements, about 80% of which are registered under the BM type (bare metal) and about 20% of which are registered under the RC type (cluster).

The visualization area 212 provides a count of functions registered in the workflow management system 100, and the types of elements the functions support. In some embodiments, one or more functions are associated with a task in a workflow, to be executed at a corresponding element when the workflow is executed. In the example configuration in FIG. 2A, the visualization area 212 shows that there are 111 functions which support various element types, i.e., BM, VM (virtual machine), RC, and NF (network function). The described element types are non-limiting examples.

The visualization area 214 provides a count of workflows in the workflow management system 100, and their corresponding workflow types. In the example configuration in FIG. 2A, the visualization area 214 shows that there are 83 workflows, about 80% of which are dynamic workflows, and about 20% of which are static workflows. A dynamic workflow, as described herein, is dynamically and automatically modifiable by the system based on at least the element configuration of an element at which the workflow is selected to be executed. In some embodiments, this dynamic feature permits a dynamic workflow to be automatically re-configured to be executed at any of multiple elements. A static workflow is not configured to be modifiable dynamically and automatically by the system. In some embodiments, a static workflow is specifically configured to be executed at a specific element, rather than at multiple elements as described with respect to dynamic workflows.

The visualization area 216 provides a count of batches of workflows, and the average execution time. One or more of the visualization areas 210, 212, 214, 216 are omitted or configured to show other data, in accordance with some embodiments.

The location selection menu 206 and date selection menu 208 permit the user to show data in the visualization areas 210, 212, 214, 216 as filtered by a location selected from the location selection menu 206, and/or by a date selected from the location selection menu 206. In some embodiments, at least one of the location selection menu 206 and date selection menu 208 is omitted.

FIG. 2B is a schematic diagram of the screen 200B of the UI, in accordance with some embodiments.

As described herein the screen 200B is displayed upon user operation of the setting button 204 in the dashboard screen 200A. One or more other screens of the UI as described herein also include the screen 200B at a side to help the user to navigate through various screens and/or options in the UI. For simplicity, the screen 200B that may occur along with one or more screens of the UI as described herein is omitted.

The screen 200B comprises a plurality of selectable menu items 230, 232, 234, 236. The menu item 230 is for accessing the dashboard screen 200A. The menu item 232 is for accessing one or more screens for managing (e.g., registering or editing or deleting) elements or element configurations, e.g., as described with respect to operation 102 and/or FIGS. 3A-3D. The menu item 234 is for accessing one or more screens for managing (e.g., registering or editing or deleting) workflows or workflow configurations and/or for executing workflows, e.g., as described with respect to operation 104 and/or FIGS. 5A-5I. The menu item 236 is for accessing one or more screens for managing (e.g., registering or editing or deleting) functions or function configurations, e.g., as described with respect to FIG. 4.

Functions are associated with one or more tasks in various workflows managed by the workflow management system 100.

The screen 200B further comprises selectable sub-menu items 242, 244, 246 under the menu item 234. The Workflow Template sub-menu item 242 is configured to provide access to a template list of workflow templates usable for building new workflows, e.g., as described with respect to FIGS. 5A-5D.

Figure 5B:
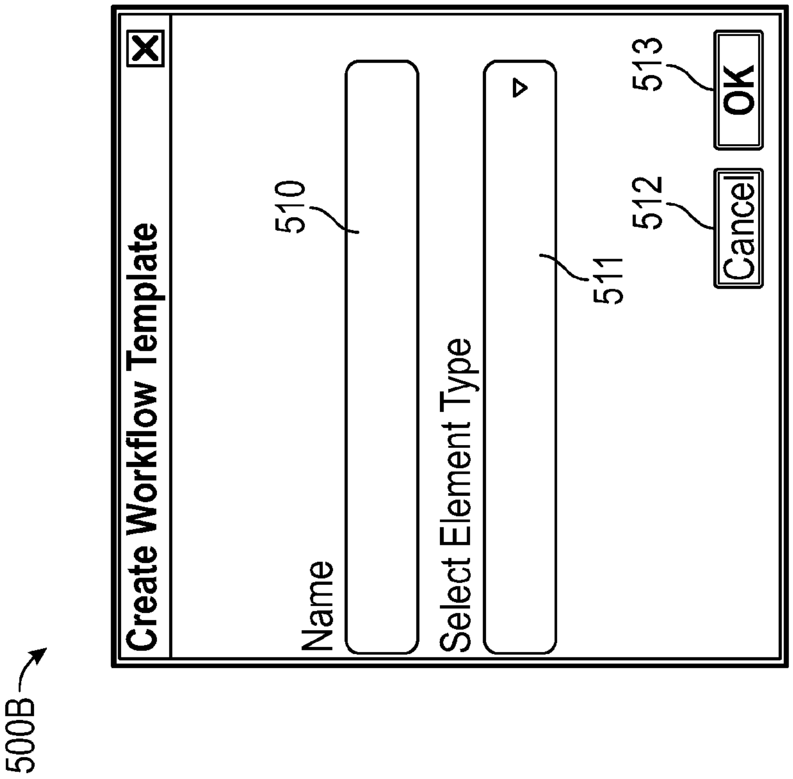
Figure 5A:
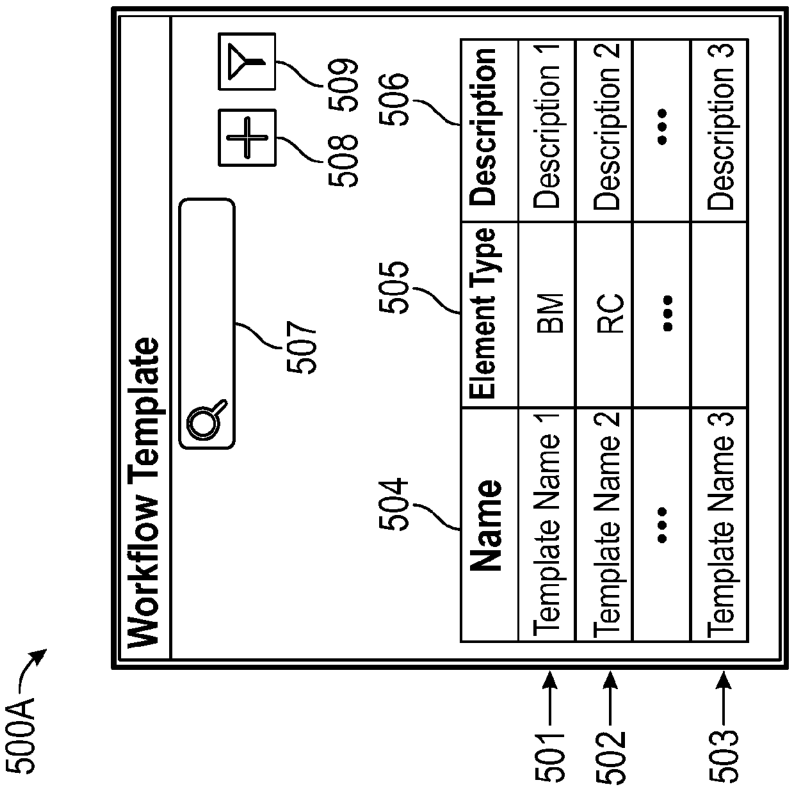
Figure 5C:
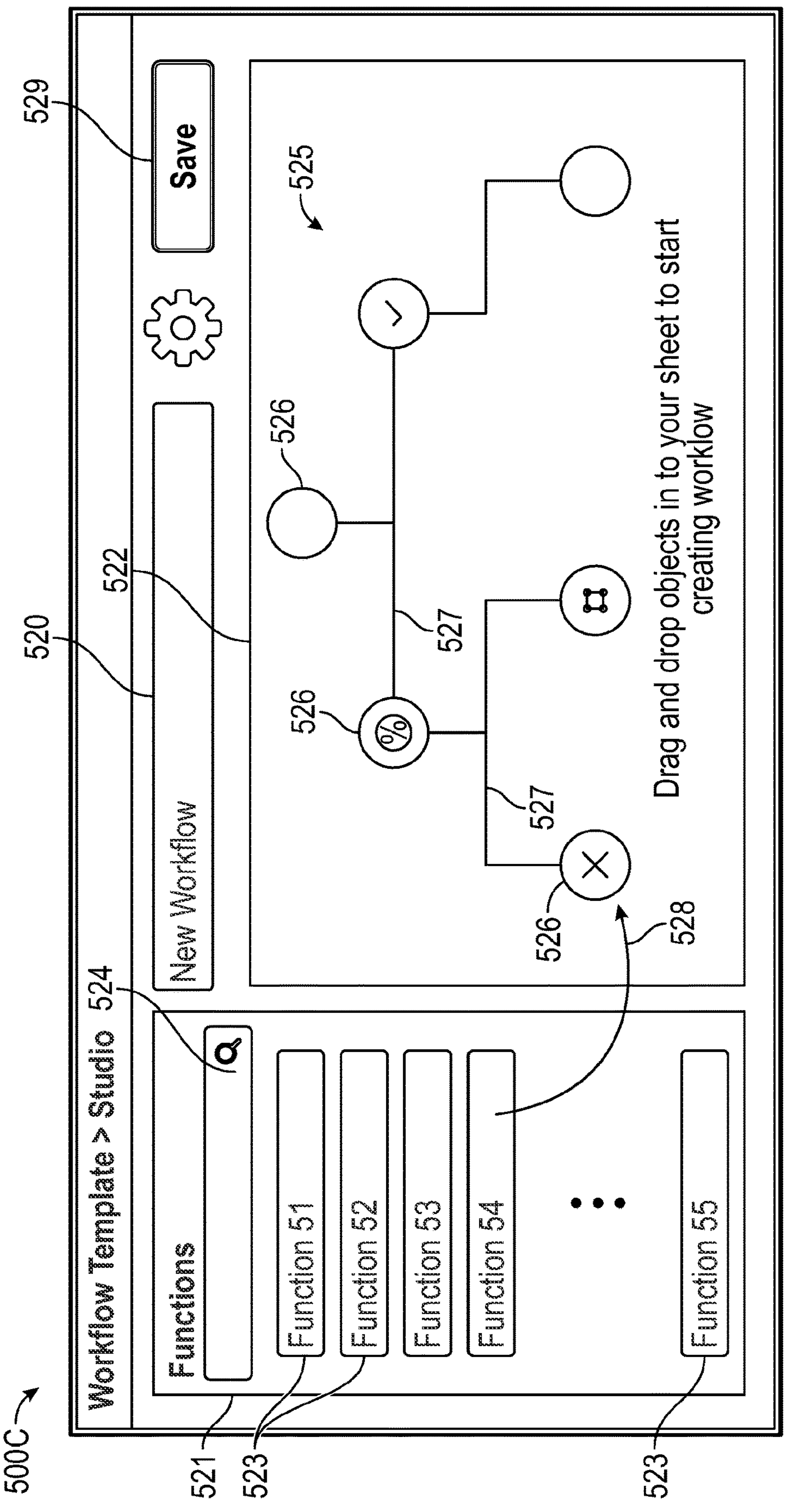
Figure 5D:
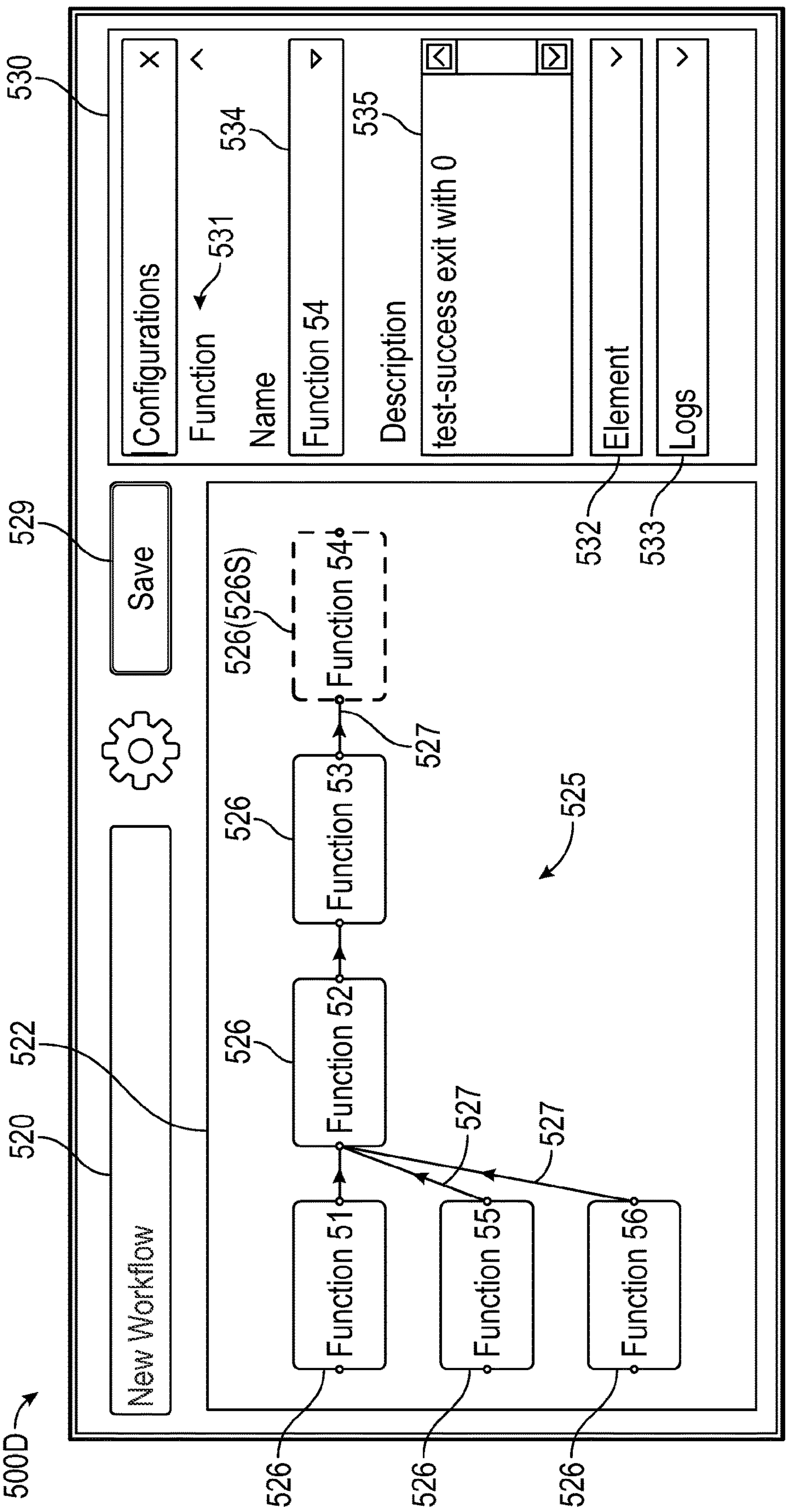
Figure 5F:
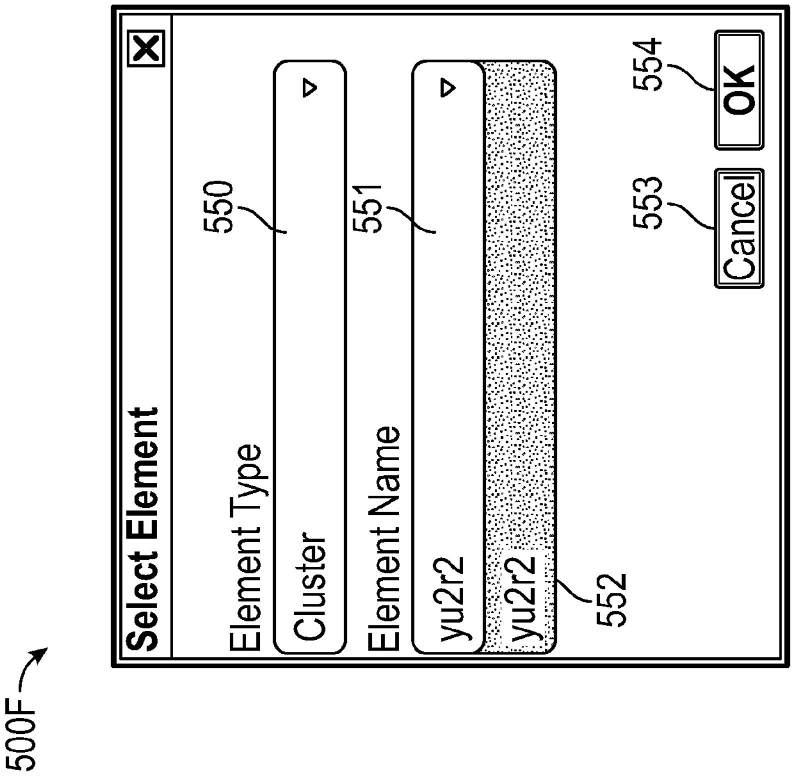
Figure 5E:
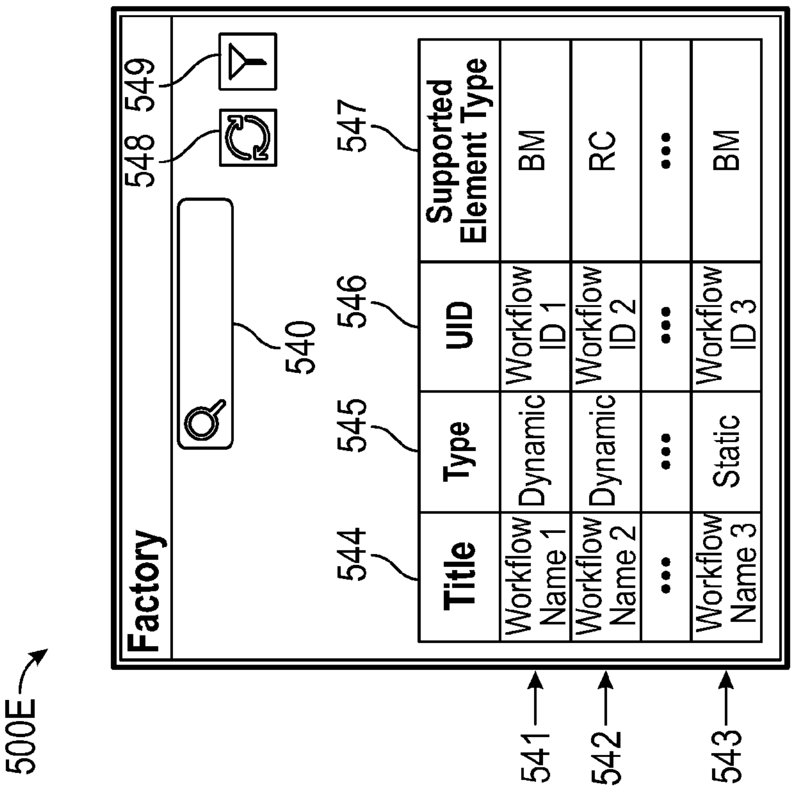
Figure 5G:
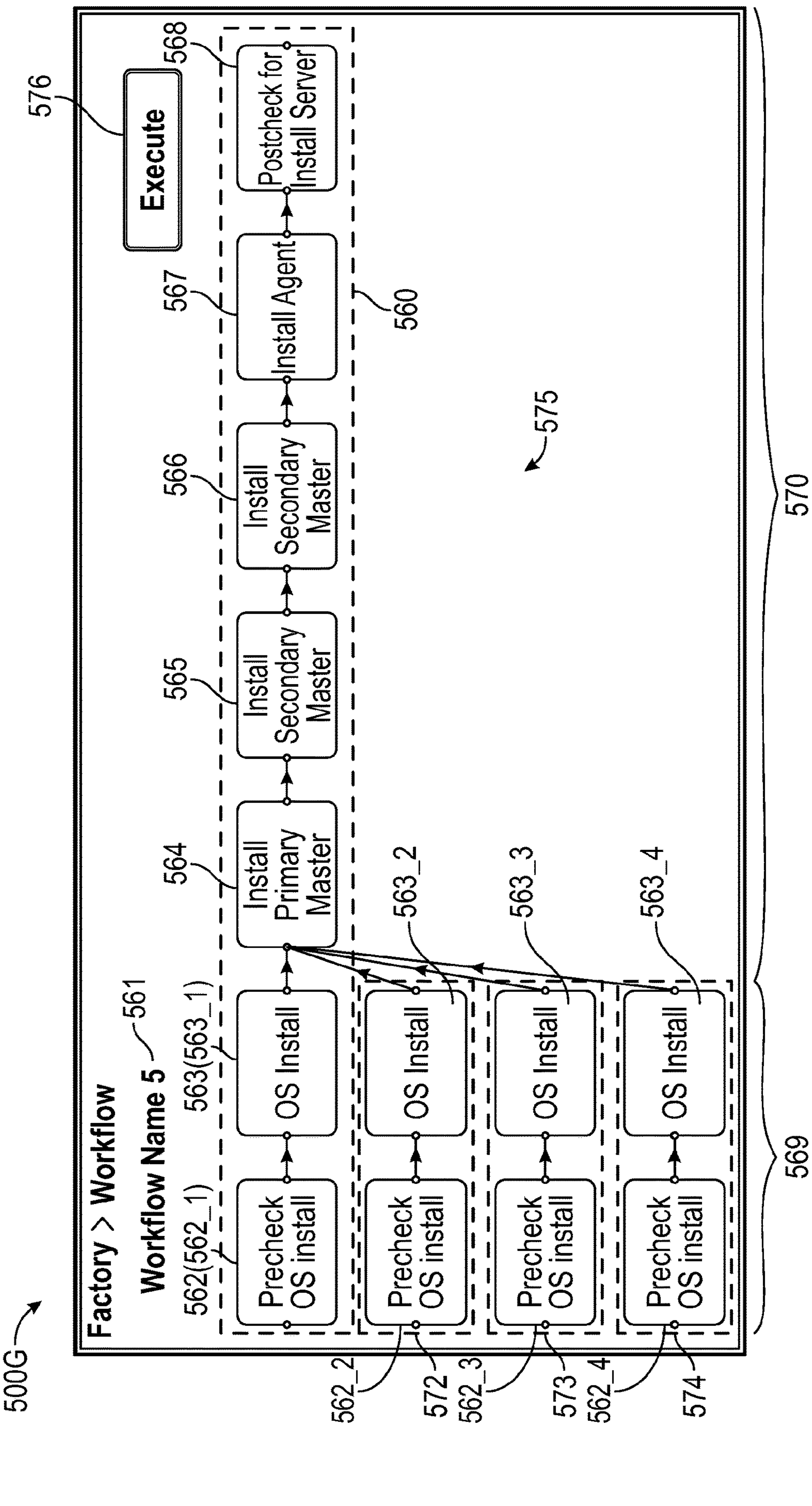

The Factory sub-menu item 244 is configured to provide access to a workflow list of workflows managed by the workflow management system 100, e.g., as described with respect to FIGS. 5E-5G. The user is provided with various options for executing a workflow selected from the workflow list on one or more elements, deleting an existing workflow from the workflow list, refreshing the workflow list, or filtering the workflow list for creating, editing, deleting workflows. The user is further provided with various options for debugging a workflow.

The Execute Workflow sub-menu item 246 is configured to display an executed workflow list of executed workflows. As example of such a list is described with respect to FIG. 5H. The user is provided with at least one option for requesting real time log information related to a selected task. The user is further provided with various options for resuming (rerunning) a workflow, in whole or in part, as described herein, e.g., with respect to FIG. 5I. Further features include displaying configurations of a task, refreshing the executed workflow list, or filtering the executed workflow list based on status and start date.

The screen 200B further comprises a navigation indicator 240 that indicates the user's current location within the UI. In the example configuration in FIG. 2B, the navigation indicator 240 "Execute Workflow" corresponds to the currently selected Execute Workflow sub-menu item 246.

FIGS. 3A-3D are schematic diagrams showing various screens or panels of the UI for managing elements, in accordance with some embodiments. In at least one embodiment, the screens or panels of the UI described with respect to FIGS. 3A-3D are provided by the module 112 to permit a user to interact with the engine 122 for managing (e.g., registering or editing or deleting) elements having corresponding element configurations stored in the database 130.

Figure 3A:
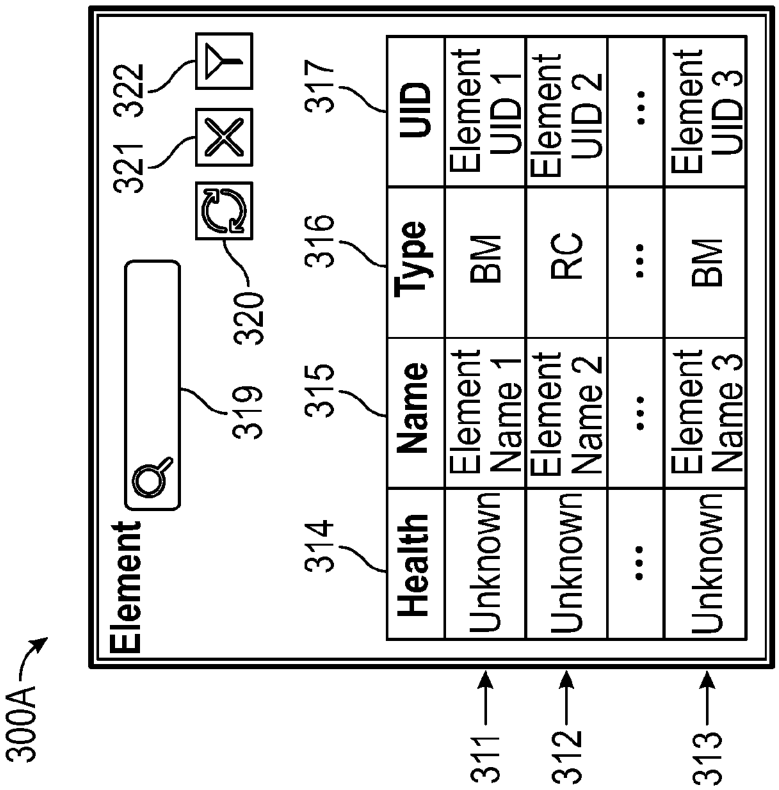

FIG. 3A is a schematic diagram of a screen 300A of the UI, in accordance with some embodiments. In some embodiments, the screen 300A is displayed upon user selection of the Element menu item 232 in the screen 200B.

The screen 300A includes an element list including elements managed by the workflow management system 100 and stored in the database 130. Each element corresponds to a row in the element list. For simplicity, three elements 311, 312, 313 are specifically indicated in FIG. 3A. The number of elements displayed in the screen 300A and/or managed by the workflow management system 100 is not limited to a particular number. Each element in the screen 300A includes a corresponding health status, an element name, an element type, and an element unique identification (UID) correspondingly under columns 314-317. The screen 300A further comprises a search bar 319 to permit the user to search for a particular element. The screen 300A also includes a button 320 for refreshing the element list, a button 321 for adding (or registering) a new element, and a button 322 for filtering the element list.

For each of the elements 311-313, the health status (column 314) indicates whether there is a fault or abnormality at the element, or whether the element is healthy (i.e., no fault or abnormality). In the example configuration in FIG. 3A, the health status at all elements 311-313 is Unknown. Other health statuses are within the scopes of various embodiments. In some embodiments, the health status (column 314) is omitted. The element name (column 315) is a human understandable and/or descriptive name given to each element when the element is created or loaded into the workflow management system 100. The element UID (column 317) is a unique identification automatically generated by the system for each element. The element type (column 316) indicates the type of each element. As described herein with respect to some embodiments, examples of element types include, but are not limited to, BM (bare metal) and RC (cluster). Other element types, i.e., VM (virtual machine), NF (network function), or the like, are within the scopes of various embodiments.

Figure 3B:
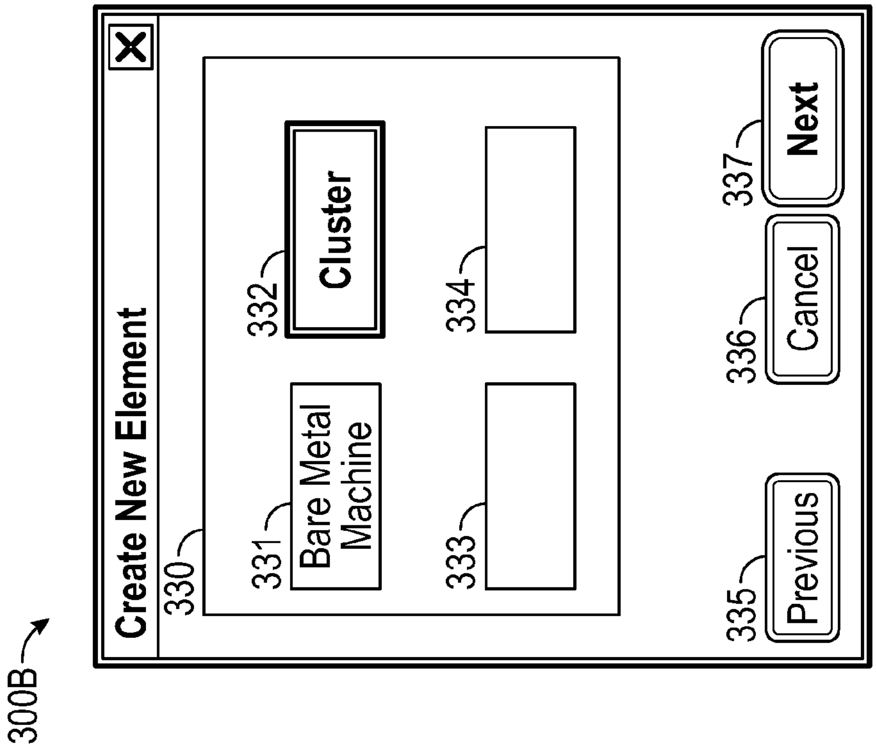
Figure 3C:
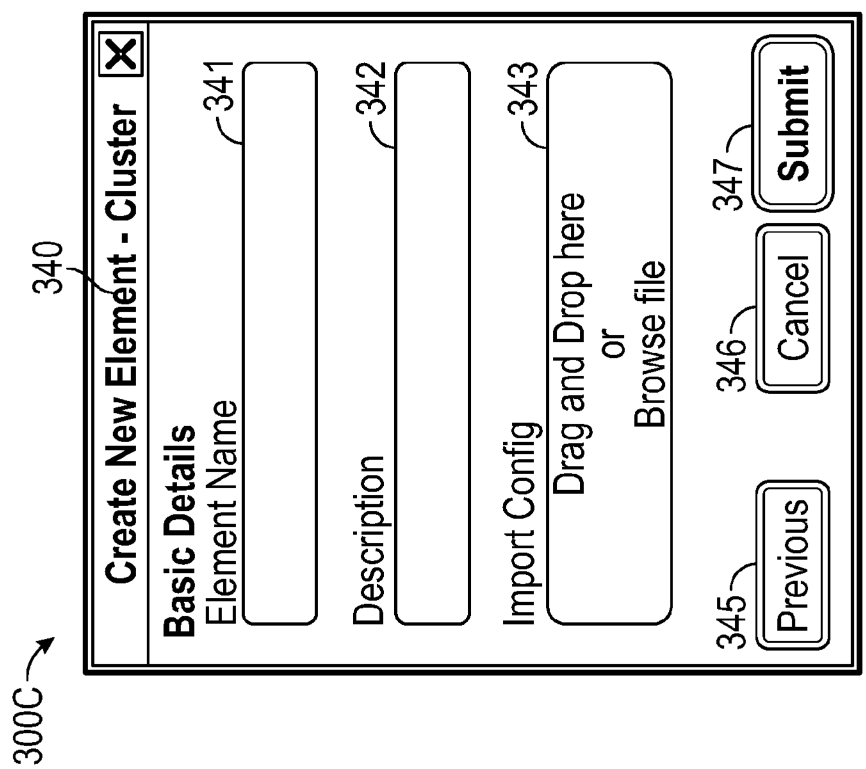
Figure 3D:
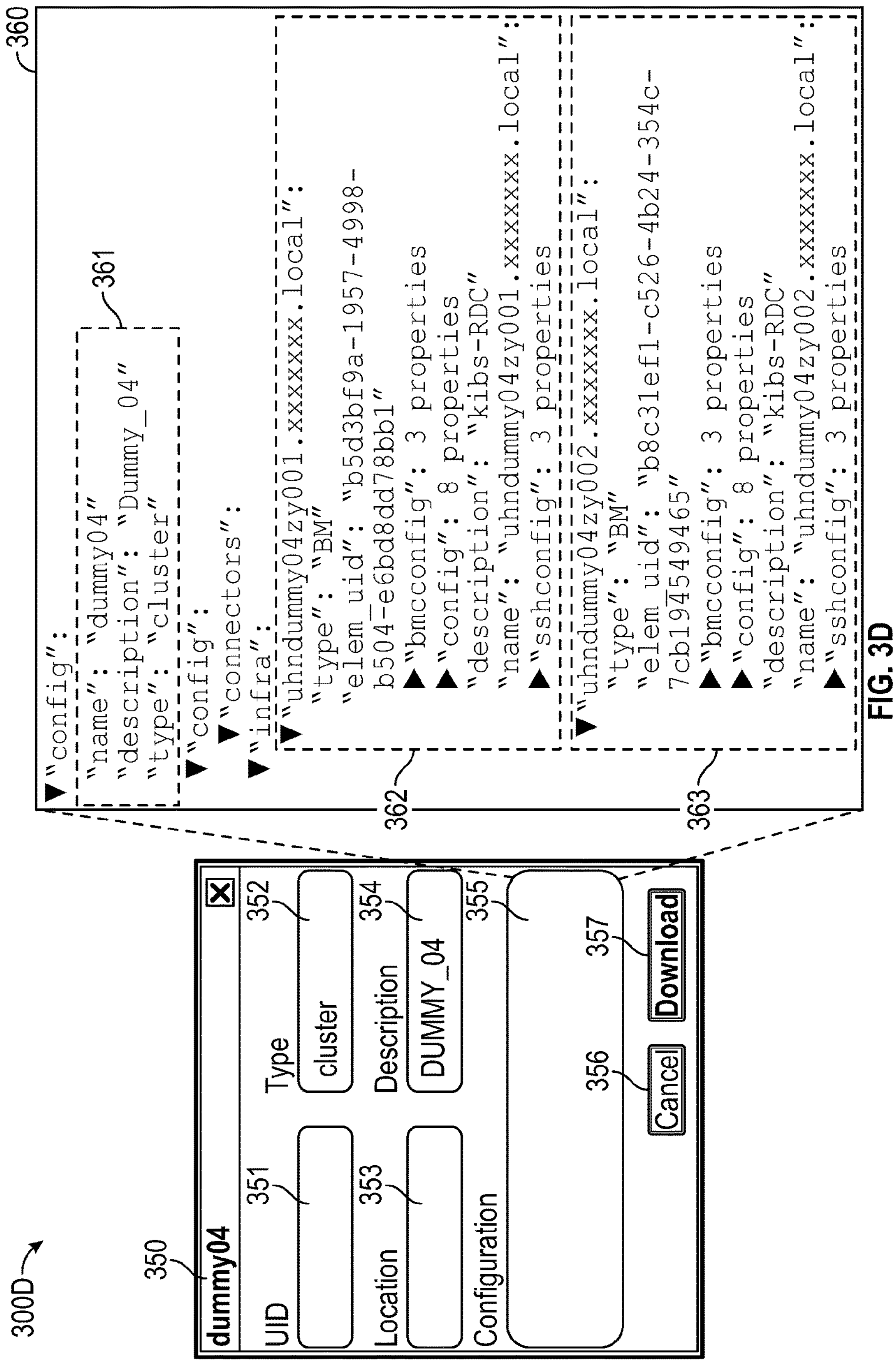

From the element list in the screen 300A, the user may view and/or edit an element configuration of each element, by selecting the corresponding row in the element list, as described with respect to FIG. 3D. The user may also delete a element from the element list, by selecting the corresponding row in the element list, and operating or selecting a delete button or option (not shown). By operating the button 320, the element list is refreshed to obtain an updated element list. The button 321 permits the user to add a new element, as described with respect to FIG. 3B. The button 322 permits the user to filter the element list based on, e.g., the health status and/or element type.

FIG. 3B is a schematic diagram of a screen 300B of the UI, in accordance with some embodiments. In some embodiments, the screen 300B is displayed upon user operation of the button 321 in the screen 300A to add a new element.

The screen 300B comprises an input area 330 for receiving user input of an element type of the new element to be created. In the example configuration in FIG. 3B, the input area 330 comprises a plurality of buttons or selectable menu items 331-334 each corresponding to an element type supported or manageable by the workflow management system 100. For example, the button 331 corresponds to the BM element type, the button 332 corresponds to the RC element type, and the buttons 333, 334 corresponds to further element types (not shown) other than BM or RC. In some embodiments, the other element types and the corresponding buttons 333, 334 are omitted. Examples of alternatives to the buttons 331-334 include, but are not limited to, radio buttons, a menu (e.g., a drop-down menu), or the like.

The screen 300B further comprises a Previous button 335 to return to a previous screen of the UI from which the screen 300B progressed, a Cancel button 336 to abort the process of adding a new element, and a Next button 337 to accept the selected element type and progress to a next step of the process of adding a new element, as described with respect to FIG. 3C.

FIG. 3C is a schematic diagram of a screen 300C of the UI, in accordance with some embodiments. In some embodiments, the screen 300C is displayed upon user operation of the Next button 337 in the screen 300B.

The screen 300C includes an indicator 340 indicating the element type selected on the screen 300B. For example, when, in the screen 300B, the user selects the button 332 corresponding to the RC element type and then operates the Next button 337, the UI progresses to the screen 300C in which the indicator 340 shows "Cluster" corresponding to the selected element type at the button 332 in the screen 300B. For another example, when, in the screen 300B, the user selects the button 331 corresponding to the BM element type and then operates the Next button 337, the indicator 340 in the screen 300C will show "Bare Metal" or the like.

The screen 300C further comprises an input area 341 for receiving user input of an element name for the new element, an input area 342 for receiving user input of an element description of the new element, and an input area 343 for importing an element configuration of the new element. In some embodiments, an element configuration comprises a JavaScript Object Notation (JSON) configuration, for example, as described with respect to FIG. 3D. Other configurations and/or specifications and/or programing language or codes for describing an element configuration are within the scopes of various embodiments. The user is given an option to drag and drop a file containing the element configuration of the new element into the input area 343, or to browse for such a file, e.g., in a computer system and/or in the database 130. Other manners for loading or inputting or selecting the element configuration of the new element are within the scopes of various embodiments. In some situations, the element configuration imported into the input area 343 already includes an element name and/or an element description. In such situations, any element name and/or element description input into the input area 341 and/or the input area 342 will be ignored and overridden by the element name and/or element description included in the imported element configuration.

The screen 300C further comprises a Previous button 345 to return to a previous screen of the UI from which the screen 300C progressed, a Cancel button 346 to abort the process of adding a new element, and a Submit button 347 to register the new element with the element type, element name, element description and element configuration input and/or imported at the screen 300B and screen 300C. In some embodiments, upon user operation of the Submit button 347, the newly registered element is stored in the database 130 and displayed in an updated element list of the screen 300A.

FIG. 3D is a schematic diagram of a screen 300D of the UI, in accordance with some embodiments. In some embodiments, the screen 300D is displayed upon user selection of an element from the element list in the screen 300A.

The screen 300D includes an indicator 350 indicating the element name (e.g., "dummy04") of the selected element, and display areas 351-355 correspondingly displaying the element UID, the element type (e.g., "cluster" or RC), the location, the element description (e.g., "DUMMY_04"), and the element configuration of the selected element. For simplicity, detailed information of the element UID and the element location is omitted in the display areas 351, 353. In some embodiments, the displayed information in one or more of the display areas 351-355 is viewable only, i.e., the displayed information is not editable, for example, where the user does not have sufficient privileges to edit the information. In some embodiments, the displayed information in one or more of the display areas 351-355 is editable, e.g., where the user has sufficient privileges. The screen 300D further includes a Cancel button 356 to close the screen 300D, and a Download button 357 to download the element configuration of the selected element. In some embodiments, the downloaded element configuration is usable to create a new element, e.g., by importing the downloaded element configuration into the input area 343 on the screen 300C.

An enlarged view 360 in FIG. 3D shows an example element configuration displayed in the display area 355. In the example configuration in FIG. 3D, the selected element is a cluster or a group of nodes, and the element configuration of the element includes not only information 361 about the element (or group of cluster), but also information 362, 363 about nodes included in the group of cluster. Specifically, the information 361 indicates that the element has an element name "dummy04", an element description "DUMMY_04", and an element type "cluster" (i.e., RC). The information 362 indicates that a first node of the element has corresponding first name, type "BM", first UID, first configuration information with corresponding properties, first description, or the like. The information 363 indicates that a second node of the element has corresponding second name, type "BM", second UID, second configuration information with corresponding properties, second description, or the like. Other element configurations and/or information containable in an element configuration are within the scopes of various embodiments.

Figure 4:
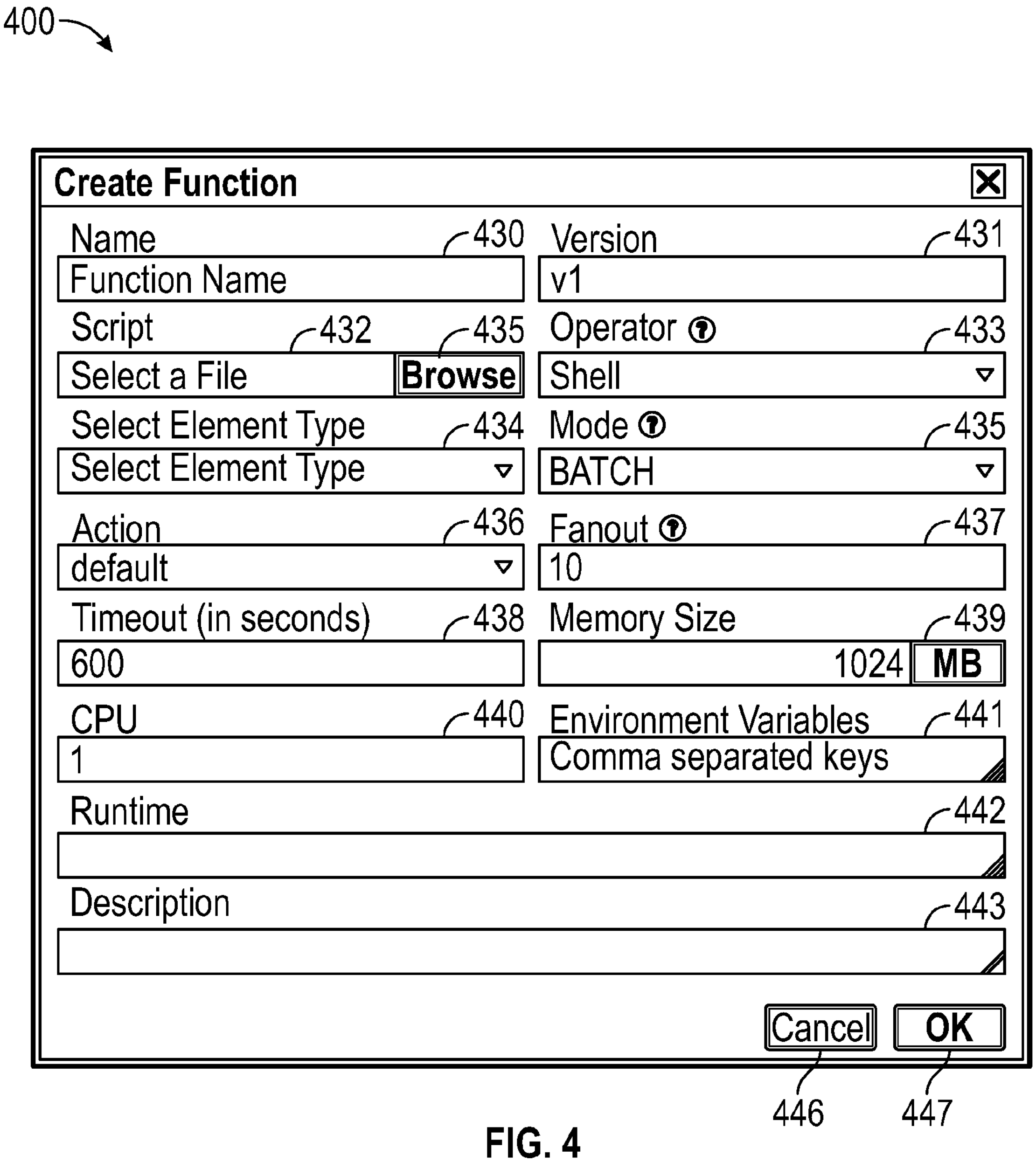

FIG. 4 is a schematic diagram of a screen 400 of the UI, in accordance with some embodiments.

In some embodiments, upon user selection of the Function menu item 236 in the screen 200B, the UI displays a screen (not shown) similar to the screen 300A and showing a function list of functions managed by the workflow management system 100 and stored in the database 130 and/or the repository 150. The function list is similar to the element list described with respect to FIG. 3A, and includes, for each function, details such as a function name, a supported element type on which the function can be executed, a function description, a function UID, and a mode of operation. The function list is displayed with a button which is similar to the button 321 in the screen 300A, and which is for adding (or registering) a new function. Upon user operation of such button, the screen 400 is displayed.

The screen 400 comprises a plurality of input areas 430-443 correspondingly for various details above a new function to be created, such as function name, version, function script, operator, supported element type, mode of operation, action, fanout, timeout, memory size, CPU (central processing unit), environment variables, runtime, and function description. Some of the details include default information that does not necessarily require user input, whereas other details require user input.

For example, the user may input a function name in the input area 430. Functions can be updated, and after an update of a function the user and/or the system may change the version of the function in the input area 431. For the function script, the user may select a script file to be executed as at least a part of the function by using a Browse button 445 to find and select an intended script file. The filename of the selected script file is displayed in the input area 432. In some embodiments, the intended script file or function script is selected from a plurality of script files in the repository 150. Examples of function scripts include Ansible scripts, or other types of computer-executable code. The input area 433 comprises a drop-down menu for user selection of an intended operator. Example operators include, but are not limited to, Shell (where the function script will be executed on a worker pod), and SSH (Secure Shell, where the function script will be executed on a target node). The input area 434 comprises a drop-down menu for user selection of a supported element type, e.g., BM, RC, VM or the like. The input area 435 comprises a drop-down menu for user selection of an intended mode. Example modes include, but are not limited to, BATCH (where a workflow including the function as a task is to be executed at a plurality of selected elements), and UNIT (where the workflow is to be executed at only one selected element). The input area 436 comprises a drop-down menu for user selection of an intended action. Example actions include, but are not limited to, default (where a workflow including the function as a task cannot change the element configuration of an element where the workflow is to be executed), and mutable (where the workflow can change the element configuration). The user and/or the system may specify a fanout factor to be used with the function in the input area 437. The user and/or the system may specify a timeout (per element) for the function to exit in the input area 438. The user and/or the system may specify a memory size required for a worker pod to perform the function in the input area 439. The user and/or the system may specify a number of CPUs required for a worker pod to perform the function in the input area 440. The user and/or the system may specify one or more environment variables for the function in the input area 441. The user and/or the system may specify the runtime, e.g., an executor image (or worker image) which the function will use, in the input area 442. The user may input a function description of the function in the input area 443.

The screen 4000 further comprises a Cancel button 446 to abort the process of adding a new function, and an OK button 447 to register the created new function. In some embodiments, upon user operation of the OK button 447, the newly registered function is stored in the database 130 and displayed in an updated function list. In some embodiments, the dashboard microservice 110 and the engines 120 include one or more corresponding modules and engines configured to manage functions in a manner similar to how the module 112 and the engine 122 are configured to manage elements, as described herein.

FIG. 5A is a schematic diagram of a screen 500A of the UI, in accordance with some embodiments. In some embodiments, the screen 500A is displayed upon user selection of the Workflow Template sub-menu item 242 in the screen 200B.

The screen 500A includes a template list including workflow templates managed by the workflow management system 100 and stored in the database 130. Each workflow template corresponds to a row in the template list. For simplicity, three workflow templates 501, 502, 503 are specifically indicated in FIG. 5A. The number of workflow templates displayed in the screen 500A and/or managed by the workflow management system 100 is not limited to a particular number. Each workflow template in the screen 500A includes a template name, an element type, and a template description correspondingly under columns 504-506. The screen 500A further comprises a search bar 507 to permit the user to search for a particular workflow template. The screen 500A also includes a button 508 for adding (or registering) a new workflow template, and a button 509 for filtering the template list. For each of the templates 501-503, the template name (column 504) is a human understandable and/or descriptive name given to each workflow template when the workflow template is created or loaded into the workflow management system 100. The element type (column 505) indicates the element type, e.g., BM, RC, or the like, of elements where workflows generated from the workflow template are executable. The template description (column 506) is a human understandable description, e.g., of one or more functions of workflows generated from the workflow template. In some embodiments, each workflow template itself is a workflow having a workflow configuration and executable at an element of the corresponding element type. In some embodiments, when the element type of a workflow is the BM type, the workflow or a modified workflow generated from the workflow is to be executed at a target node. In some embodiments, when the element type of a workflow is the RC type, the workflow or a modified workflow generated from the workflow template is to be executed at various target nodes in a cluster.

From the template list in the screen 500A, the user may view details of a workflow template, by selecting the corresponding row in the template list. In some embodiments, the details of a workflow template are displayed in a screen similar to a screen 500D described with respect to FIG. 5D. The displayed details are modifiable, permitting the user to quickly create a new workflow based on the prestored and/or predesigned workflow template. The user may delete a workflow template from the template list, by selecting the corresponding row in the template list, and operating or selecting a delete button or option (not shown). The button 508 permits the user to add a new workflow without using a workflow template, as described with respect to FIGS. 5B-5D. The button 509 permits the user to filter the template list based on, e.g., the element type.

FIG. 5B is a schematic diagram of a screen 500B of the UI, in accordance with some embodiments. In some embodiments, the screen 500B is displayed upon user operation of the button 508 in the screen 500A to add a new workflow.

The screen 500B comprises an input area 510 for receiving user input of a workflow name for the new workflow to be created, and an input area 511 for receiving user input of an element type of the new workflow. In the example configuration in FIG. 5B, the input area 511 comprises a drop-down menu enabling the user to select the BM element type, RC element type, or the like. Other configurations of the input area 511 are within the scopes of various embodiments. The screen 500B further comprises a Cancel button 512 to abort the process of adding a new workflow, and an OK button 513 to accept the selected element type and progress to a next step of the process of adding a new workflow, as described with respect to FIG. 5C.

FIG. 5C is a schematic diagram of a screen 500C of the UI, in accordance with some embodiments. In some embodiments, the screen 500C is displayed upon user operation of the OK button 513 in the screen 500B.

The screen 500C includes an indicator 520 indicating the workflow name (e.g., "New Workflow") input at the input area 510 in the screen 500B, a function list 521, and an input area 522 for building a new workflow. The function list 521 is visually presented concurrently with the input area 522, and comprises a plurality of functions commonly designated as 523. The functions 523 in the function list 521 are those functions managed by the workflow management system 100, stored in the database 130, and supporting the element type input or selected for the new workflow at the input area 511 in the screen 500B. The screen 500C further comprises a search bar 524 which permits the user to search for a desired function from the function list 521, based on one or more details described with respect to FIG. 4, e.g., the function name.

The input area 522 is configured to receive user input to build a new workflow 525. The new workflow 525 is being built as a directed acyclic graph (DAG) and comprises a plurality of tasks connected by one or more connections. In the workflow 525, the tasks are commonly designated as 526, and the connections are commonly designated as 527. The screen 500C is configured to permit user manipulations, e.g., drag-and-drop operations, of one or more functions 523 from the function list 521 into the input area 522. An example drag-and-drop operation is designated as 528 in FIG. 5C. Each function dragged-and-dropped into the input area 522 becomes a corresponding task 526 in the workflow 525. The user may specify (e.g., drag-and-drop) a same function as two or more tasks in the workflow 525. The user may further add, delete, modify, move tasks 526 and/or connections 527 to build the desired workflow 525. When the user finishes building the workflow 525 and operates a Save button 529, a workflow configuration corresponding the workflow 525 is stored in the database 130.

FIG. 5D is a schematic diagram of a screen 500D of the UI, in accordance with some embodiments. In some embodiments, the screen 500D is a version of the screen 500C and is displayed while the workflow 525 is being built. In one or more embodiments, the screen 500D is displayed to show details of a selected workflow template, to permit the user to edit the details, and to store, in the database 130, the edited details as a workflow configuration of a new workflow quickly generated based on the workflow template.

Similar to the screen 500C, the screen 500D includes the function list 521 (not shown in FIG. 5D for simplicity) displayed concurrently with the input area 522 in which various functions from the function list 521 have been added to the workflow 525 as tasks 526 connected by connections 527. Compared to the screen 500C, the screen 500D additionally includes a display area 530 where details of a selected task in the workflow 525 are viewable. In the example configuration in FIG. 5D, the selected task is a task 526S at the end of the workflow 525 being built. The selected task 526S is displayed in a format visually distinctive from a format of the other tasks of the workflow 525. For example, the selected task 526S is displayed with a different color from a color of the other tasks of the workflow 525.

The display area 530 comprises a function drop-down 531, an element drop-down 532, and a log drop-down 533. The function drop-down 531, when selected, causes display areas 534, 535 to be shown to visually present details of the function of the selected task 526S. Specifically, the name "Function 54" of the function of the selected task 526S is displayed in the display area 534, and the function description of the function is displayed in the display area 535. The display area 534 is configured as a drop-down menu from which the functions of other tasks in the workflow 525 are selectable. When another function is selected from the drop-down menu 534, the corresponding function description is displayed in the display area 535, and the corresponding task in the workflow 525 is displayed to be visually distinctive from the other tasks of the workflow 525. The information of a selected task displayed in the display areas 534, 535 help the user to verify whether the workflow 525 is being built correctly. In some embodiments, when either the element drop-down 532 or the log drop-down 533 is selected, the UI stops showing the display areas 534, 535. When the element drop-down 532 is selected, the UI shows one or more elements or element types associated with the selected task and/or the workflow 525. When the log drop-down 536 is selected, the UI shows log information associated with the selected task and/or the workflow 525. In some embodiments, information in the element drop-down 532 and/or the log drop-down 533 is not available until the workflow 525 is executed.

FIG. 5E is a schematic diagram of a screen 500E of the UI, in accordance with some embodiments. In some embodiments, the screen 500E is displayed upon user selection of the Factory sub-menu item 244 in the screen 200B, or upon user operation of the Save button 529 to store a new workflow.

The screen 500E includes a workflow list including workflows managed by the workflow management system 100 and stored in the database 130. The workflow list includes new workflows which are generated by editing one or more workflow templates in the template list described with respect to FIG. 5A, or are newly created as described with respect to FIGS. 5B-5D. Each workflow corresponds to a row in the workflow list. For simplicity, three workflows 541, 542, 543 are specifically indicated in FIG. 5E. The number of workflows displayed in the screen 500E and/or managed by the workflow management system 100 is not limited to a particular number. Each workflow in the screen 500E includes a workflow name (e.g., "Title"), a workflow type, a workflow UID, and a supported element type correspondingly under columns 544-547. The screen 500E further comprises a search bar 540 to permit the user to search for a particular workflow in the workflow list. The screen 500E also includes a button 548 for refreshing the workflow list, and a button 549 for filtering the workflow list.

For each of the workflows 541-503, the workflow name (column 544) is a human understandable and/or descriptive name given to each workflow when the workflow is created or loaded into the workflow management system 100. The workflow type (column 545) indicates whether the workflow is a dynamic workflow, or a static workflow. Other workflow types are within the scopes of various embodiments. The workflow UID (column 546) is a unique identification automatically generated by the system for each workflow in the workflow list. The supported element type (column 547) indicates the element type, e.g., BM, RC, or the like, of elements where the workflow and modified workflows generated from the workflow are executable.

From the workflow list in the screen 500E, the user may view details of a workflow, by selecting the corresponding row in the workflow list. In some embodiments, the details of a workflow are displayed in a screen similar to the screen 500D described with respect to FIG. 5D. The displayed details are modifiable, permitting the user to edit the workflow. The user may delete a workflow from the workflow list, by selecting the corresponding row in the workflow list, and operating or selecting a delete button or option (not shown). The user may select a workflow from the workflow list for execution, as described with respect to FIGS. 5F-5I.

FIG. 5F is a schematic diagram of a screen 500F of the UI, in accordance with some embodiments. In some embodiments, the screen 500F is displayed upon user selection of a workflow from the workflow list in the screen 500E for execution.

The screen 500F is configured to receive user input or user selection of an element where the selected workflow is to be executed. The screen 500F comprises an input area 550 for an element type of a desired element, and an input area 551 for receiving user input of an element name of the element. In the example configuration in FIG. 5F, the input area 550 comprises a drop-down menu enabling the user to select the BM element type, RC element type, or the like. Other configurations of the input area 550 are within the scopes of various embodiments. In some embodiments, the system automatically selects or specifies the element type in the input area 550, based on the corresponding supported element type of the selected workflow indicated in the workflow list in the screen 500E, at column 547. In the example configuration in FIG. 5F, the element type "Cluster" (or RC) is selected or specified in the input area 550.

The input area 551 comprises a drop-down menu enabling the user to select a desired element from a list of elements which are managed by the workflow management system 100, are stored in the database 130 and correspond to the element type selected or specified in the input area 550. The input area 551 is further configured to accept user input of an element name, and to search for a matching element as characters of the element name are being input. When a matching element is found, the matching element is displayed, e.g., at 552, for user selection. The screen 500F further comprises a Cancel button 553 to abort the process of executing the selected workflow, and an OK button 554 to accept the element selected in the input area 551 and progress to a next step in the process of executing the selected workflow, as described with respect to FIG. 5G.

FIG. 5G is a schematic diagram of a screen 500G of the UI, in accordance with some embodiments. In some embodiments, the screen 500G is displayed in response to user operation of the OK button 554 in the screen 500F to confirm user selection of an element (in the input area 551) where a selected workflow (selected from the workflow list in the screen 500E) is to be executed. The screen 500G shows a modified workflow 575 which is automatically generated by the system based on a selected workflow 560 and based on an element configuration of the element selected for execution of the workflow 560.

The screen 500G includes an indicator 561 indicating the element name, i.e., "Workflow Name 5," of the selected workflow 560. The workflow 560 includes a plurality of tasks 562-568 arranged and/or connected together on a sequence from task 562 to task 568. The plurality of tasks 562-568 in the workflow 560 comprises a series or set of first tasks 562, 563, followed by a series or set of second tasks 564-568. The first tasks 562, 563 are configured to be executed at each target node in a group of nodes or a cluster, and the second tasks 564-568 are configured to be executed at one or more nodes in the group of nodes or cluster. The numbers of the first tasks and the second tasks in the workflow 560 and/or the sequence of connection of the first tasks preceding the second tasks are examples. In some embodiments, a selected workflow comprises at least one first task and at least one second task connected to the at least one first task, and the at least one second task may precede or follow the at least one first task.

In some embodiments, the system retrieves the element configuration of the element selected for execution of the workflow 560 from the database 130, and determines that the selected element is a group of nodes or a cluster. In an example, the system determines a number of nodes in the selected element by analyzing or reading the element configuration as described with respect to FIG. 3D. The system further determines that the workflow 560 includes a set of first tasks 562, 563 which may be executed at a node of the selected element, but may not be at the same time executed at other nodes of the selected element. The system then automatically modifies the workflow 560 so that the number of sets of first tasks 562, 563 in the modified workflow becomes equal to the number of nodes in the selected element. As a result, the same set of first tasks 562, 563 is executable at the same time at each node of the element.

In the example configuration in FIG. 5G, the selected element includes four nodes. The original set of first tasks 562, 563 included in the workflow 560 is configured to be executed in series at a first node of the selected element, and is designated in FIG. 5G as tasks 562_1, 563_1. The system automatically generates three replicas 572, 573, 574 of the original set of first tasks 562, 563. The replica 572 includes tasks 562_2, 563_2 which are correspondingly identical to tasks 562_1, 563_1, connected to each other and to task 564 in the same manner as tasks 562_1, 563_1, and configured to be executed in series at a second node of the selected element. The replica 573 includes tasks 562_3, 563_3 which are correspondingly identical to tasks 562_1, 563_1, connected to each other and to task 564 in the same manner as tasks 562_1, 563_1, and configured to be executed in series at a third node of the selected element. The replica 574 includes tasks 562_4, 563_4 which are correspondingly identical to tasks 562_1, 563_1, connected to each other and to task 564 in the same manner as tasks 562_1, 563_1, and configured to be executed in series at a fourth node of the selected element. The modified workflow 575 automatically generated by modifying the workflow 560 is therefore obtained and displayed in the screen 500G.

The screen 500G further comprises an Execute button 576 for receiving user instruction to execute the modified workflow 575. In the execution of the modified workflow 575, each of the original set of first tasks 562, 563 and the replicas 572, 573, 574 is configured to perform an OS installation process 569 to install an OS at the corresponding target node. Tasks 562_1~562_4 are configured for pre-checking before OS installation, and tasks 563_1~563_4 are configured for OS installation. The second tasks 564-568 are configured to perform a cluster installation process 570 to configure the nodes of the element, after the OS installation, into a cluster. The cluster installation process 570 may begin upon completion of the OS installation process 569, i.e., upon successful completion of all four tasks 563_1~563_4. Tasks 564-568 are sequentially executed. In an example, task 564 configured for installing a Primary Master (PM) is executed at one node of the selected element, tasks 565-566 configured for installing a Secondary Master (SM) are executed at least at one node different from the PM node, and task 567 configured for installing at least one Agent is executed at least at one further node different from the PM and SM nodes. Task 568 configured for post-checking is the last task of the modified workflow 575. The described specific functions are examples. Other functions, e.g., BIOS upgrade, are within the scopes of various embodiments.

The described number of nodes in the selected element and/or the number of replicas of the set of first tasks automatically generated by the system are examples. In some embodiments, the selected element includes N nodes, where N is a natural number greater than 1, and the system automatically generates (N−1) replicas of the set of first tasks, so that each of the N nodes has its own set of first tasks to be executed thereon. A status of the executed modified workflow 575 is included in a screen of the UI, as described with respect to FIG. 5H.

Figure 5H:
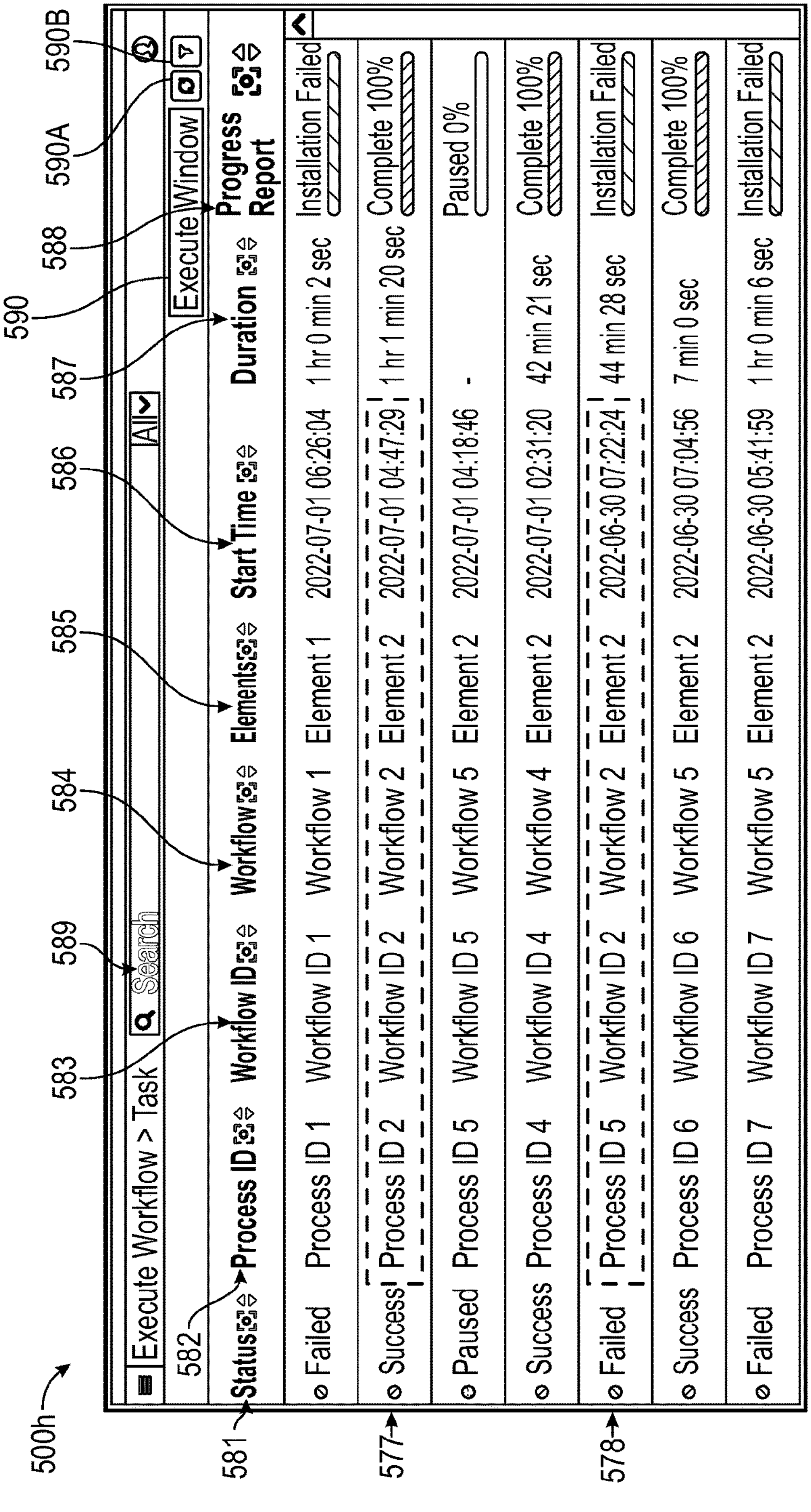

FIG. 5H is a schematic diagram of a screen 500H of the UI, in accordance with some embodiments. In some embodiments, the screen 500H is displayed upon user instruction to execute the modified workflow 575, and/or upon user selection of the Execute Workflow sub-menu item 246 in the screen 200B.

The screen 500H includes an executed workflow list of executed workflows each corresponding to a row in the executed workflow list. Each executed workflow includes a corresponding status (failed, success, or paused), process ID, workflow ID, workflow name, the element at which the workflow is executed, start time, duration, and progress report correspondingly under columns 581-588. The screen 500H further comprises a search bar 589 to permit the user to search for a particular executed workflow. The screen 500H also includes a button 590 to permit the user to execute (or re-execute) a workflow selected from the executed workflow list, a button 590A for refreshing the executed workflow list, and a button 590B for filtering the executed workflow list based on, e.g., status and/or start date.

For each of the executed workflows, the workflow name (column 584) is the human understandable and/or descriptive name given to the workflow when the workflow is created or loaded in to the workflow management system 100. The workflow ID (column 583) is a unique identification automatically generated by the system for each executed workflow. The element (column 585) is the human-understandable name of, or a unique identification automatically generated by the system for, the element at which the workflow is executed. In at least one embodiment, multiple elements are displayed, e.g., when the user executes OS installation (a workflow) on multiple clusters (elements). The process ID (column 582) is a unique identification automatically generated by the system. In case of a batch execution (where a workflow is executed at a plurality of selected elements), the process ID will be same for all of the plurality of elements. For instance, when a user wants to execute one workflow (e.g., OS installation) on multiple clusters, one process ID will be automatically created by the system for this batch. In some situations, as illustrated at workflows 592, 595, the same workflow (workflow ID2) executed on the same element (Element 2) but at different start times will result in different process IDs (process ID2 and process ID5). In at least one embodiment, the process ID is unique to every instance of execution of a workflow.

Figure 5I:
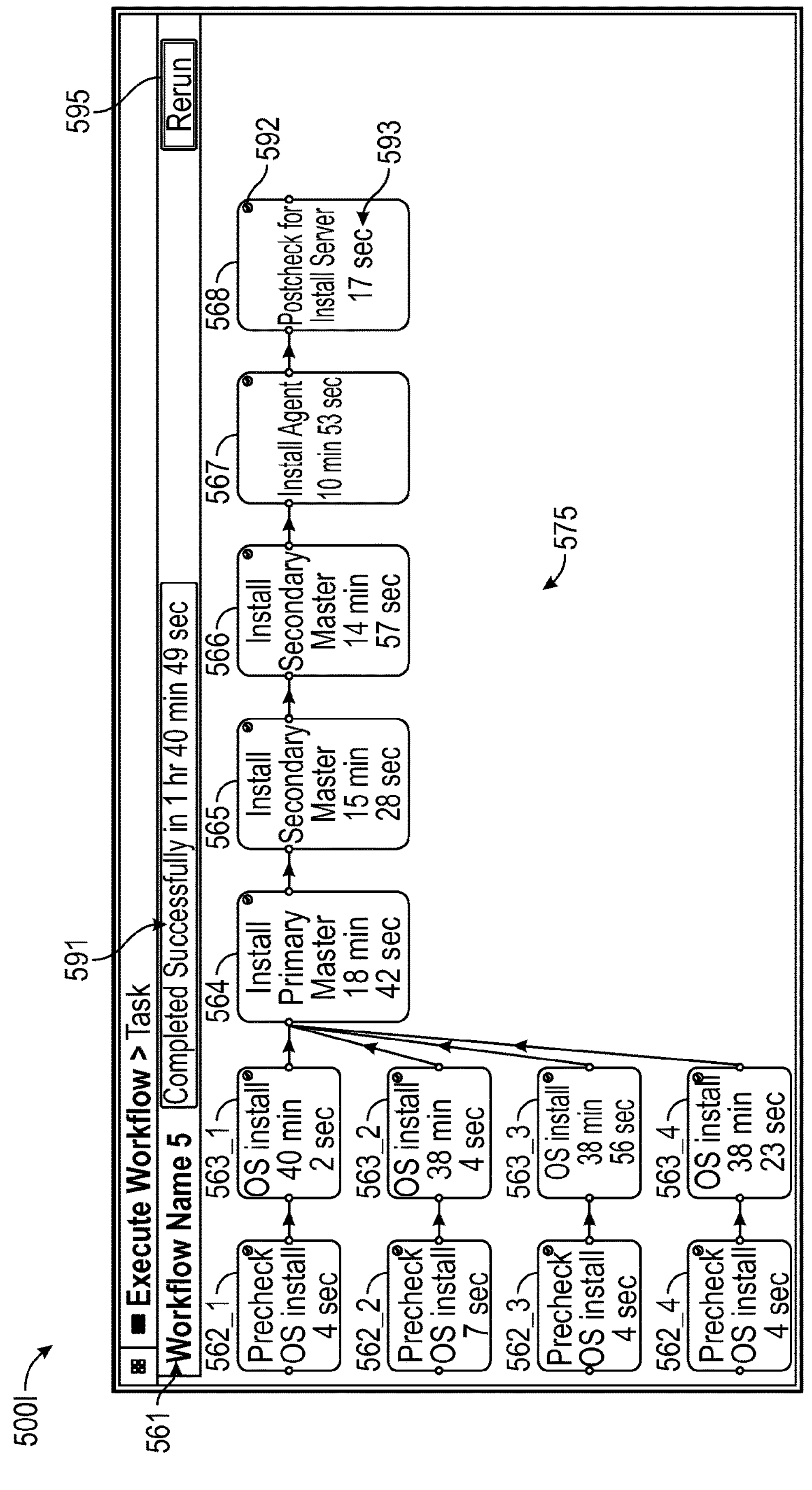

FIG. 5I is a schematic diagram of a screen 500I of the UI, in accordance with some embodiments. In some embodiments, the screen 500I is displayed upon user selection of a workflow from the executed workflow list in the screen 500H.

The screen 500I gives the user further details of the selected executed workflow including a step-by-step view of each task in the workflow, the time taken to complete a task, status of a task, or the like. The screen 500I further permits the user to re-run the workflow, for example, where the workflow execution fails for any element. In the example configuration in FIG. 5I, an execution status of the modified workflow 575 is displayed in the screen 500I.

The screen 500I includes, besides the indicator 561 indicating the workflow name of the executed workflow, an indicator 591 indicating the status and the time taken to complete the workflow 575. In the example configuration in FIG. 5I, all tasks of the modified workflow 575 have been successfully completed. Each task, e.g., task 568, is displayed with an icon 592 indicating its "completed successfully" or "success" status, and an indicator 593 indicating the time taken to complete the task, e.g., "17 sec." A non-completed or failed task (not shown) is visually presented in a format visually distinctive from success tasks. For example, success tasks are visually presented with the color green, whereas other non-success or failed tasks are visually presented with other colors. The described distinctive formats are examples. Other format schemes are within the scopes of various embodiments. For example, visually distinctive formats may have different degrees of transparency, may be blinking or otherwise animated, may be with or without shadows, may have different font types, font colors and/or font variations (e.g., bold or italicized text), may have different icons and/or text added, may have different combinations of the above visual effects and/or other effects not specifically described herein. The screen 500I further comprises a Rerun button 595, for receiving user input to re-run the execution of the workflow 575, e.g., when there is a failed task. In some embodiments, one or more operations described with respect to FIGS. 5A-5I are performed by one or more of the module 114, engine 124, database 130, repository 150, one or more worker pods 128, elements 160 as described with respect to FIG. 1.

In some embodiments, the described dynamic workflow creation and execution provide one or more advantages over other approaches. Specifically, a server is often located in a datacenter/building/site. In accordance with other approaches, a dedicated engineering team is going from site to site to install software, e.g., an OS, in a BM to be configured as a server. This is a manual and time-consuming process. Further, after the OS is installed, the engineering team needs to obtain a permit to get access at node level. In some situations, it may take a week or longer to obtain an appropriate service level agreement (SLA) permit. After gaining the required access, the engineering team needs to run scripts manually to install a cluster. This process is a repetitive job prone to human errors.

The above issues of the other approaches are avoidable in a workflow management system 100 in accordance with some embodiments. The workflow management system comprises a UI configured to permit users to effectively and intuitively manage elements, functions and workflows. The workflow management system is further configured to automatically generate different modified workflows from a same existing or newly created workflow, depending on different element configurations of various elements at which the generated workflows are to be executed. For example, the workflow management system is configured to replicate at least a portion of the workflow based on a number of nodes in an element selected for workflow execution. As a result, in at least one embodiment, it is possible to quickly scale the same workflow to obtain different modified workflows corresponding to various elements with different sizes (e.g., different numbers of nodes). In some embodiments, a user of the workflow management system is provided with a UI to cause automatic generation of dynamic workflows from existing workflows, execute workflows, and/or monitor statuses of the executed workflows. In at least one embodiment, such automatic generation of dynamic workflows from workflows usable as templates reduces the amount of time and/or efforts that would be otherwise spent on manual work and/or travel for preparation and/or execution of scripts to perform similar tasks. One or more embodiments provide one or more advantages including, but not limited to, reduced manual errors, improved performance, reduced cost. In terms of performance, it may take several days for an engineering team to complete an OS and cluster installation workflow (e.g., the workflow 560) in accordance with the manual process of the other approaches. In contrast, it is possible in some embodiments to create over 50 clusters in parallel, within 2 to 3 hours.

Figure 6A:
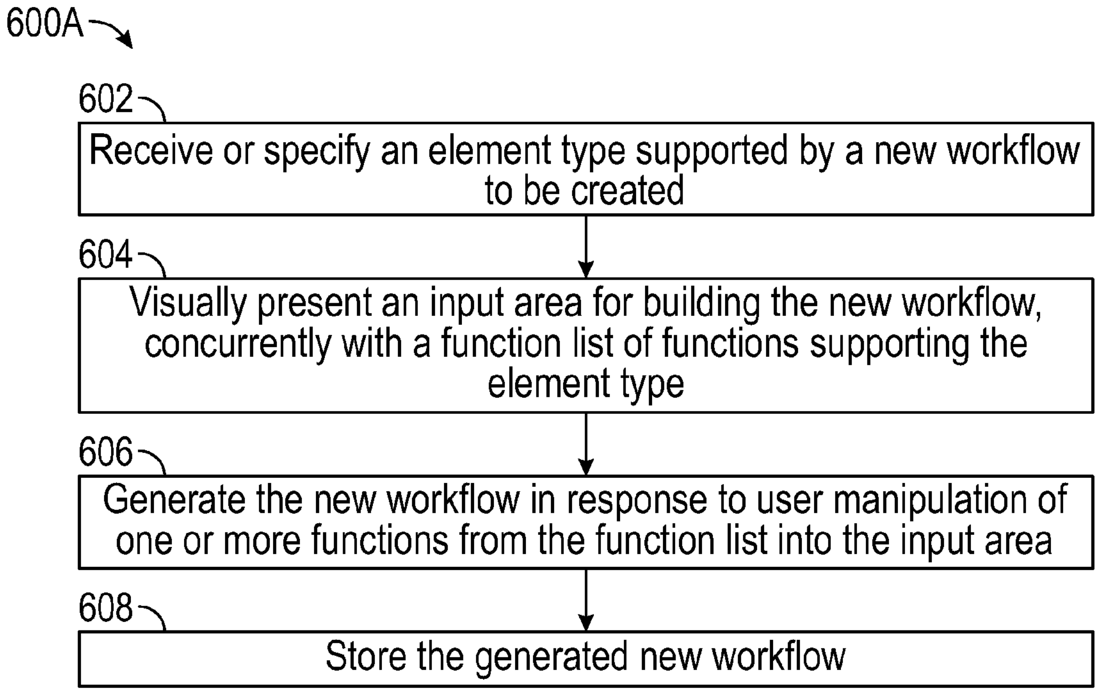
FIGS. 6A-6B are flow charts of various processes in a workflow management system, in accordance with some embodiments.

FIG. 6A is a flow chart of a process 600A in a workflow management system, in accordance with some embodiments. In some embodiments, the process 600A is performed by the workflow management system 100, for creating a new workflow.

At operation 602, an element type supported by a new workflow to be created is received or specified, for example, as described with respect to FIG. 5B.

At operation 604, an input area for building the new workflow is visually present concurrently with a function list of functions supporting the element type. For example, as described with respect to FIG. 5C, an input area 522 for building the new workflow is visually present concurrently with a function list 521 of functions 523 supporting the element type received or specified at the screen 500B in FIG. 5B.

At operation 606, the new workflow is generated in response to user manipulation of one or more functions from the function list into the input area, for example, as described with respect to FIGS. 5C, 5D.

At operation 608, the generated new workflow is stored, for example, in the database 130 and as described with respect to FIGS. 5C, 5D.

Figure 6B:
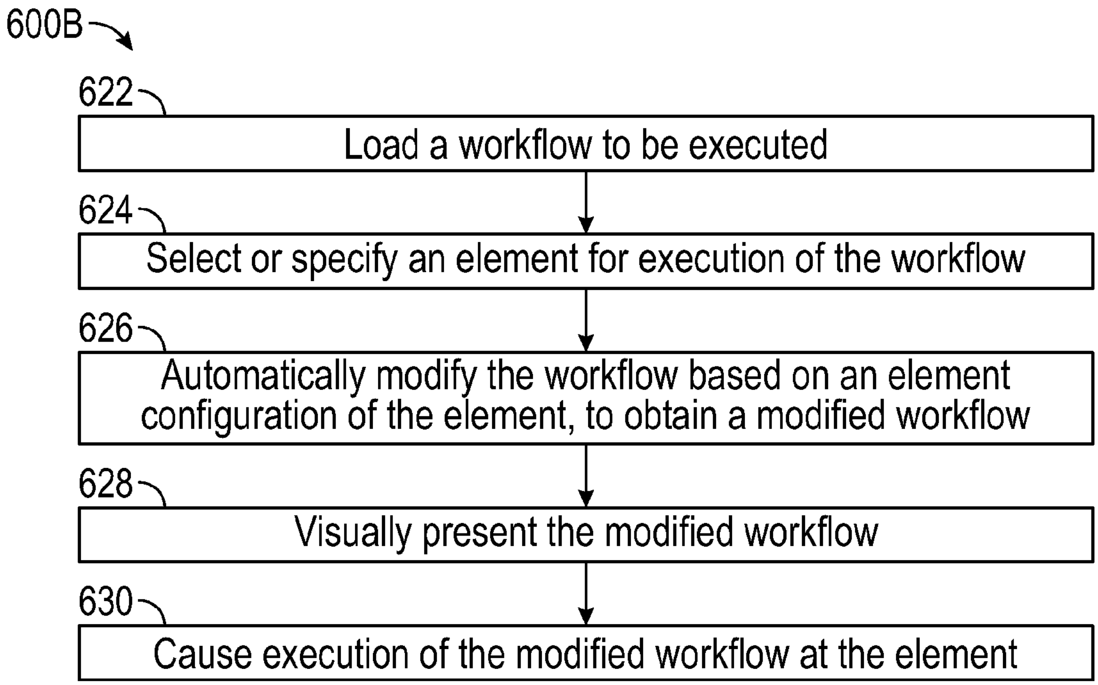

FIG. 6B is a flow chart of a process 600B in a workflow management system, in accordance with some embodiments. In some embodiments, the process 600B is performed by the workflow management system 100, for dynamic workflow creation and execution.

At operation 622, a workflow to be executed is loaded by the workflow management system. In an example, a workflow to be executed is selected by a user from a workflow list as described with respect to FIG. 5E, and the corresponding workflow configuration is loaded from the database 130 into a memory and/or a processor of the workflow management system. In another example, when a new workflow is created, for example, as described with respect to FIGS. 5A-5D, the new workflow may be automatically selected for execution, and the corresponding workflow configuration of the new workflow is loaded into a memory and/or a processor of the workflow management system.

At operation 624, an element for execution of the workflow is selected or specified, for example, as described with respect to FIG. 5F.

At operation 626, the workflow is automatically modified based on an element configuration of the element, to obtain a modified workflow. For example, as described with respect to FIG. 5G, the workflow 560 is automatically modified based on an element configuration of the element, to obtain a modified workflow 575.

At operation 628, the modified workflow 575 is visually presented, for example, as described with respect to FIG. 5G. In some embodiments, operation 628 is omitted.

At operation 630, the workflow management system causes execution of the modified workflow at the element, for example, as described with respect to FIG. 5G.

The described methods and algorithms include example operations, but they are not necessarily required to be performed in the order shown. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

Figure 7:
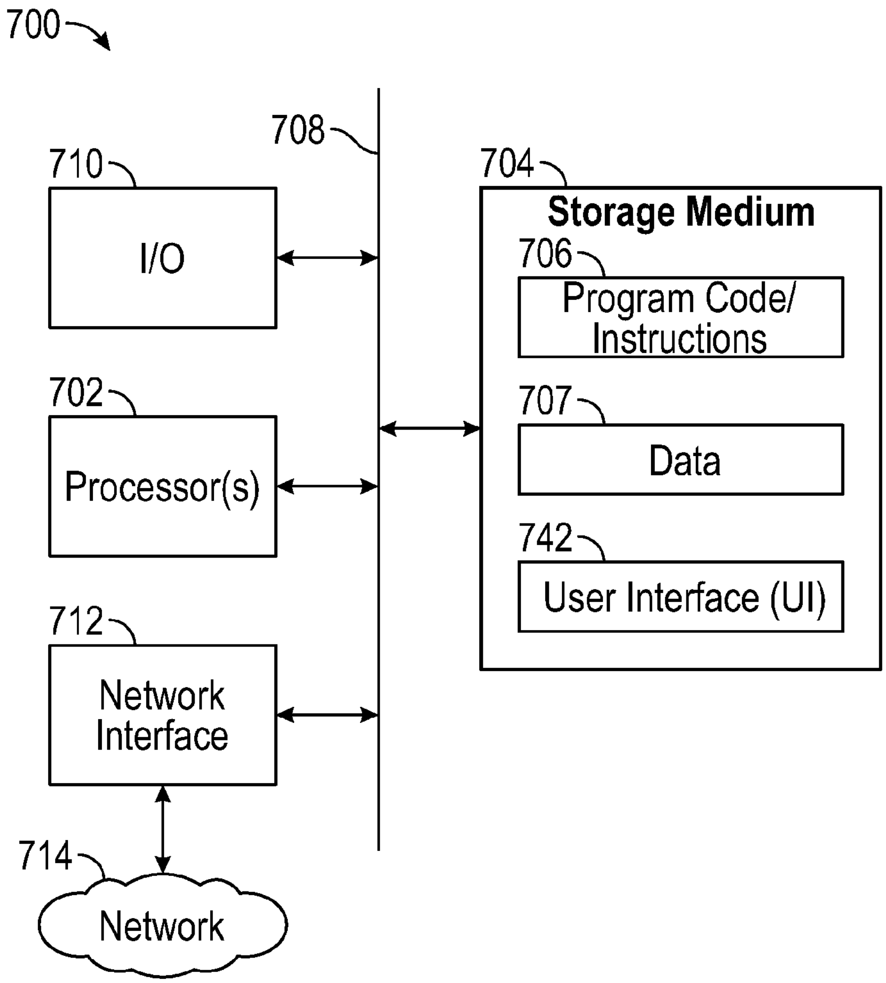
FIG. 7 is a schematic block diagram of a computer system, in accordance with some embodiments.

FIG. 7 is a schematic block diagram of a computer system 700, in accordance with some embodiments. Examples of the computer system 700 include, but are not limited to, desktop, a laptop, a tablet, a smart phone, a server, or the like.

The computer system 700 includes a hardware processor 702 and a non-transitory, computer-readable storage medium 704. Storage medium 704, amongst other things, is encoded with, i.e., stores, computer program code 706, i.e., a set of executable instructions, such as one or more algorithms, programs, applications, sets of executable instructions for a system, component, and/or module, as described with respect to one or more of FIGS. 1-6B. Execution of instructions 706 by hardware processor 702 implements a portion or all of the methods described herein in accordance with one or more embodiments (hereinafter, the noted processes and/or methods).

Processor 702 is coupled to non-transitory computer-readable storage medium 704 via a bus 708. Processor 702 is also coupled to an I/O interface 710 by bus 708. A network interface 712 is connected to processor 702 via bus 708. Network interface 712 is connected to a network 714, so that processor 702 and computer-readable storage medium 704 are connectable to external elements or devices via network 714. Processor 702 is configured to execute computer program code 706 encoded in computer-readable storage medium 704 in order to cause computer system 700 to be usable for performing a portion or all of the noted processes and/or methods. In one or more embodiments, processor 702 comprises a central processing unit (CPU), a multi-processor, a distributed processing system, an application specific integrated circuit (ASIC), and/or a suitable hardware processing unit.

In one or more embodiments, computer-readable storage medium 704 comprises an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, storage medium 704 stores computer program code 706 configured to cause computer system 700 to be usable for performing a portion or all of the noted processes and/or methods. In one or more embodiments, storage medium 704 also stores information or data 707, such as event data, consumer data, business data, policies, component configurations or the like, used in a portion or all of the noted processes and/or methods.

I/O interface 710 is coupled to external circuitry. In one or more embodiments, I/O interface 710 includes a keyboard, keypad, mouse, trackball, trackpad, touchscreen, and/or cursor direction keys for communicating information and commands to processor 702. Computer system 700 is configured to receive information through I/O interface 710. The information received through I/O interface 710 includes one or more of instructions, data, policies, configurations and/or other parameters for processing by processor 702. The information is transferred to processor 702 via bus 708. Computer system 700 is configured to receive information related to a user interface through I/O interface 710. The information is stored in computer-readable storage medium 704 as user interface (UI) 742.

Network interface 712 allows computer system 700 to communicate with network 714, to which one or more other computer systems are connected. Network interface 712 includes wireless network interfaces such as BLUETOOTH, WIFI, WIMAX, GPRS, LTE, 7G, 6G, WCDMA, or the like; or wired network interfaces such as ETHERNET, USB, IEEE-864 or the like. In one or more embodiments, a portion or all of noted processes and/or methods, is implemented in two or more computer system 700.

In some embodiments, a portion or all of the noted processes and/or methods is implemented as a standalone software application for execution by one or more hardware processors. In some embodiments, a portion or all of the noted processes and/or methods is implemented as a software application that is a part of an additional software application. In some embodiments, a portion or all of the noted processes and/or methods is implemented as a plug-in to a software application.

In some embodiments, a portion or all of the noted processes and/or methods is realized as functions of a program stored in a non-transitory computer readable recording medium. The non-transitory computer readable recording medium having the program stored therein is a computer program product. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, or the like.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A workflow management system, comprising:

at least one processor; and at least one computer readable storage medium coupled to the at least one processor and configured to store executable instructions that, when executed by the at least one processor, instruct the at least one processor to:

load a workflow comprising a plurality of tasks arranged in a sequence, automatically modify the workflow to obtain a modified workflow, based on an element configuration of an element at which the modified workflow is to be executed, the element configuration indicating hardware equipment of the element, and cause execution of the modified workflow at the element, wherein the element configuration indicates that the element is a group of N nodes, where N is a natural number greater than 1, the plurality of tasks comprises at least one first task and at least one second task connected to the at least one first task, and the executable instructions, when executed by the at least one processor, instruct the at least one processor to automatically modify the workflow by:

generating (N−1) replicas of the at least one first task, and connecting each of the (N−1) replicas of the at least one first task to the at least one second task to obtain the modified workflow.

2. The workflow management system of claim 1, wherein the executable instructions, when executed by the at least one processor, instruct the at least one processor to:

visually present the modified workflow obtained by automatically modifying the workflow, and cause the execution of the modified workflow at the element in response to user instruction to execute the visually presented modified workflow.

3. The workflow management system of claim 1, wherein the executable instructions, when executed by the at least one processor, instruct the at least one processor to, in the execution of the modified workflow, cause the at least one first task to be executed at each of the N nodes, and cause the at least one second task to be executed at one or more of the N nodes.

4. The workflow management system of claim 3, wherein each of the N nodes is a bare metal, the at least one first task comprises an operating system (OS) installation to install an OS at each of the bare metals, and the at least one second task comprises a cluster installation to configure the N nodes, after the OS installation, into a cluster.

5. The workflow management system of claim 1, wherein the executable instructions, when executed by the at least one processor, instruct the at least one processor to:

in response to user selection of the workflow from a plurality of workflows, visually present at least one input area for receiving user input of the element where the modified workflow is to be executed, and in response to the user input of the element, retrieve the element configuration of the element to, based on the element configuration, automatically modify the workflow to obtain the modified workflow to be executed at the element.

6. The workflow management system of claim 5, wherein the at least one input area comprises:

a first input area for receiving an element type of the element, and a second input area for receiving an element name of the element.

7. The workflow management system of claim 1, wherein the element configuration comprises a JavaScript Object Notation (JSON) configuration.

8. The workflow management system of claim 1, wherein the executable instructions, when executed by the at least one processor, instruct the at least one processor to:

visually present a first input area for building a new workflow, visually present a function list of functions concurrently with the first input area, in response to user manipulation of one or more functions from the function list into the first input area, generate one or more tasks corresponding to the one or more functions, and connect the one or more tasks to obtain the new workflow, and store the new workflow.

9. The workflow management system of claim 8, wherein the executable instructions, when executed by the at least one processor, instruct the at least one processor to:

visually present a second input area for receiving user input of an element type supported by the new workflow, and include, in the function list, functions supporting the element type received through the second input area.

10. The workflow management system of claim 1, wherein the executable instructions, when executed by the at least one processor, instruct the at least one processor to perform at least one of:

visually presenting at least one first input area for receiving user input of a new element, wherein the user input of the new element comprises an element type, an element name and an element configuration of the new element, or visually presenting at least one second input area for receiving user input of a new function, wherein the user input of the new function comprises a function name, an element type supported by the new function, and a script to be executed as at least a part of the new function.

11. A method of workflow management, said method performed at least in part by at least one processor, said method comprising:

loading a workflow comprising a plurality of tasks arranged in a sequence, wherein the plurality of tasks comprises at least one first task and at least one second task connected to the at least one first task;

for a group of N nodes, where N is a natural number greater than 1, generating (N−1) replicas of the at least one first task, and connecting each of the (N−1) replicas of the at least one first task to the at least one second task to obtain a modified workflow; and causing execution of the modified workflow, wherein the at least one first task is executed at each node in the group of N nodes, and the at least one second task is executed at one or more nodes in the group of N nodes.

12. The method of claim 11, wherein the at least one first task comprises an operating system (OS) installation to install an OS at each node in the group of N nodes, and the at least one second task comprises a cluster installation to configure the group of N nodes, after the OS installation, into a cluster.

13. The method of claim 11, further comprising:

visually presenting the modified workflow obtained by said generating and said connecting the (N−1) replicas of the at least one first task to the at least one second task, wherein said causing the execution of the modified workflow is performed in response to user instruction to execute the visually presented modified workflow.

14. A computer program product, comprising a non-transitory, tangible computer readable storage medium storing a computer program that, when executed by at least one processor, instructs the at least one processor to:

in response to user selection of a workflow, visually present at least one input area for receiving user input of an element for workflow execution, wherein the workflow comprises a first set of tasks followed by a second set of tasks, in response to the user input of the element, modify the workflow to obtain a modified workflow to be executed at the element, wherein the element is a group of N nodes, where N is a natural number greater than 1, and wherein, to modify the workflow to obtain the modified workflow, the at least one processor is instructed to:

generate (N−1) replicas of the first set of tasks, so that a number of the first set of tasks in the modified workflow is equal to N which is a number of nodes in the element and is greater than 1, and connect each of the (N−1) replicas of the first set of tasks to the second set of tasks to obtain the modified workflow, visually present the modified workflow, and in response to user instruction to execute the visually presented modified workflow, cause execution of the first set of tasks at each of the N nodes of the element, and then cause execution of the second set of tasks at one or more nodes among the N nodes of the element.

15. The computer program product of claim 14, wherein the first set of tasks comprises an operating system (OS) installation to install an OS at each of the N nodes of the element, and the second set of tasks comprises a cluster installation to configure the N nodes of the element, after the OS installation, into a cluster.

* * * * *